US007525618B2

(12) United States Patent
Hiroya et al.

(10) Patent No.: US 7,525,618 B2
(45) Date of Patent: Apr. 28, 2009

(54) LIQUID CRYSTAL DISPLAY PANEL AND LIQUID CRYSTAL DISPLAY DEVICE

(75) Inventors: Tsutomu Hiroya, Tokyo (JP); Ken Sumiyoshi, Tokyo (JP); Kouji Shigemura, Tokyo (JP)

(73) Assignee: NEC Corporation, Tokyo (JP)

( * ) Notice: Subject to any disclaimer, the term of this patent is extended or adjusted under 35 U.S.C. 154(b) by 522 days.

(21) Appl. No.: 11/334,681

(22) Filed: Jan. 18, 2006

(65) Prior Publication Data

US 2006/0158595 A1 Jul. 20, 2006

(30) Foreign Application Priority Data

Jan. 18, 2005 (JP) ............................ 2005-010945

(51) Int. Cl.
*G02F 1/1337* (2006.01)

(52) U.S. Cl. ....................... 349/123; 349/122; 349/106; 349/110

(58) Field of Classification Search ................. 349/187, 349/122, 123, 155, 158, 84, 104, 106, 110, 349/138
See application file for complete search history.

(56) References Cited

U.S. PATENT DOCUMENTS 6,844,910 B2 * 1/2005 Katsura ...................... 349/189
6,894,311 B2 * 5/2005 Maeda et al. ............... 349/147
6,947,110 B2 * 9/2005 Morimoto et al. ........... 349/114
2003/0218710 A1 * 11/2003 Hong ......................... 349/122
2004/0114093 A1 * 6/2004 Liao et al. ................... 349/187
2004/0246420 A1 * 12/2004 Morimoto et al. ........... 349/124
2007/0279565 A1 * 12/2007 Iwato et al. ................. 349/139

FOREIGN PATENT DOCUMENTS

CN 1137404 C 2/2004
JP 06-186579 7/1994
JP 10-123571 5/1998

* cited by examiner

*Primary Examiner*—James P Hughes
(74) *Attorney, Agent, or Firm*—Scully, Scott, Murphy & Presser, P.C.

(57) ABSTRACT

A liquid crystal display panel has a drive substrate and an opposing substrate disposed parallel to each other by way of a seal member provided with a liquid crystal injection inlet. A liquid crystal layer is sealed between the two substrates. Apertures are provided in the portion formed on the periphery of the pixel area of the smoothed film that is formed on the surface of the drive substrate, and an orientation film is formed so that at least part of the peripheral edge portion is positioned inside the apertures. Thereby, the liquid crystal injection time can be reduced and the panel can be set in a narrow frame, and the wiring and peripheral drive circuits are not liable to be damaged.

16 Claims, 21 Drawing Sheets

LIQUID CRYSTAL DISPLAY PANEL AND LIQUID CRYSTAL DISPLAY DEVICE

BACKGROUND OF THE INVENTION

1. Field of the Invention

The present invention relates to a liquid crystal display panel and a liquid crystal display device in which an orientation film is formed on a substrate surface, and more particularly relates to a liquid crystal display panel and a liquid crystal display device in which a polysilicon thin film transistor is formed as a switching device.

2. Description of the Related Art

In recent years, liquid crystal display devices that make use of the energy-saving, lightweight, and thin profile characteristics are used in small equipment such as projector devices and mobile phones, and in large equipment such as notebook computers and liquid crystal televisions, and the use thereof is rapidly increasing.

Liquid crystal display devices display images by applying voltage to a liquid crystal layer sealed between two substrates disposed facing each other, and control the contrast by varying the transmission ratio of light that passes through the liquid crystal layer, that is, by using the liquid crystal layer as a light control element. An example of this method is a simple matrix drive for driving a liquid crystal device in which a liquid crystal layer is sandwiched between a scanning electrode group in which a plurality of scanning electrodes are arrayed in the form of stripes, and a signal electrode group in which a plurality of signal electrodes are arrayed in the form of stripes in the direction orthogonal to the array direction of the scanning electrode group, and voltage is applied to the portions where the scanning electrodes and signal electrodes intersect in a plan view. However, a simple matrix drive has a problem in that the display quality is poor because the number of scan lines is limited.

For this reason, an active matrix in which the pixels are provided with switching devices is conventionally widely used in a liquid crystal display device in order to improve the performance of the simple matrix drive described above. A thin film transistor in which amorphous silicon is used is ordinarily used as the switching device. Since the amorphous silicon thin film transistor is easily and inexpensively formed on a substrate with a large area, it is used in a variety of fields.

However, amorphous silicon thin film transistors have a problem in that the mobility of the electric charge is poor, and when amorphous silicon is formed as the switching device, the drive circuit for driving the thin film transistor must be mounted in the vicinity of the display panel. This presents an obstacle when a liquid crystal display device is miniaturized, and it is difficult to apply a liquid crystal display device obtained using an amorphous silicon thin film transistor to a mobile telephone or other small equipment that needs to be made thinner and more lightweight.

In view of the above, liquid crystal display devices that use a polysilicon thin film transistor with a higher charge mobility than amorphous silicon are becoming more widely used. Polysilicon thin film transistors are effective for narrow framing in which the peripheral portion of the display area is made smaller because peripheral drive circuits are formed on the same substrate.

FIG. 1 is a diagram that schematically shows a conventional liquid crystal injection method. Manufacturing this type of liquid crystal display device commonly entails laminating a drive substrate 102 and an opposing substrate (not shown) by way of a seal member 103, as shown in FIG. 1, and thereafter using the capillary phenomenon to inject liquid crystal material between the two substrates from the liquid crystal injection inlet 105 formed in the seal member 103. In order to improve the video performance of the liquid crystal display device, however, there is a trend toward narrowing the interval, that is, the gap between the drive substrate 102 and the opposing substrate. VA (vertical alignment) liquid crystal which has a very low injection speed is coming to be widely used in place of TN (twisted nematic) liquid crystal which is conventionally used. For this reason, there is a problem in that time is required when the liquid crystal is injected between the drive substrate 102 and the opposing substrate.

To solve this problem, a liquid crystal display device has been proposed in prior art in which the portions other than the display area have an interval (gap) between the substrates that is greater than that of the display area, and a liquid crystal injection inlet is provided in the portion where the gap is wide (refer to Japanese Laid-Open Patent Application No. 10-123571, for example). FIG. 2 is a plan view that schematically shows the liquid crystal display device described in Japanese Laid-Open Patent Application No. 10-123571. FIG. 3A is a cross-sectional view along the line F-F shown in FIG. 2, and FIG. 3B is a cross-sectional view along the line G-G shown in FIG. 2. In FIGS. 2, 3A and 3B, the constituent components of the opposing substrate 101 and the wiring disposed on the drive substrate 102 are not shown in order to simplify the diagram. The liquid crystal display device 100 described in Japanese Laid-Open Patent Application No. 10-123571, as shown in FIGS. 2, 3A and 3B, is configured so that the following components are disposed facing each other via a resin seal member 103: an opposing substrate 101 on whose surface are formed a light-blocking film (not shown), a transparent electrode (not shown), an orientation film (not shown), and other components, and a drive substrate 102 on whose surface are formed a signal line (not shown), a scan line (not shown), a switching element 125, a protective film 122, a smoothed film 123, a pixel electrode (not shown), and an orientation film 124. A liquid crystal layer 104 is held between the opposing substrate 101 and the drive substrate 102.

The seal member 103 is formed so as to surround the periphery of the display area 106, and a liquid crystal injection inlet 105 for injecting liquid crystal is disposed in a portion thereof. A recess 107 is formed in the area that serves as the liquid crystal injection inlet 105 and in the area between the display area 106 and the seal member 103 in the surface of the drive substrate 102. The recess 107 is extended from the liquid crystal injection inlet 105, is fashioned so as to surround the display area 106, and is formed by removing the protective film 122 and the smoothed film 123, for example. Thus, the liquid crystal display device 100 has a recess 107 formed on the periphery of the liquid crystal injection inlet 105 and the display area 106, the amount of liquid crystal injected per unit of time is increased by widening the gap rather than the display area 106, and the liquid crystal is caused to permeate from the external periphery of the display area 106 toward the interior thereof to reduce the liquid crystal injection time.

However, the above-described prior art has the following problems. The liquid crystal molecules must be oriented in a fixed direction in order to drive the liquid crystal layer as a light control element. For this reason, a rubbed orientation film is disposed in the portion of the surface of the opposing substrate and the drive substrate that is in contact with the liquid crystal layer. The orientation film is commonly formed by a method in which printing is performed using an orientation plate on which a convexity is formed in the portion for forming the orientation film. Specifically, a material (orientation material) for forming an orientation film is applied to the surface of the orientation plate, and the orientation material is transferred to the surface of the drive substrate. In this manner, when the orientation film is formed by printing on a flat substrate surface, the thickness of the film at the edges of the orientation film thus formed may increase because the orientation material tends to gather at the edges of the convexity of the orientation film.

FIG. 4 is a cross-sectional diagram showing the thick film portion of the orientation film. If the orientation film 114 has a thick film portion, as shown in FIG. 4, the cell gap in this portion becomes narrow, that is, a narrow gap portion 116 is formed, and the effect thereof is difficult to obtain even if a recess 107 is formed in the surface of the drive substrate 102, and time is required for liquid crystal injection. Thus, the liquid crystal display device described in Japanese Laid-Open Patent Application No. 10-123571 has a problem in that when an orientation film is formed by printing, a thick film portion is formed on the edges thereof and the injection speed of the liquid crystal is reduced.

Since the voltage-transmission characteristics of the liquid crystal varies in accordance with the thickness of the orientation film and the thickness of the liquid crystal layer, when a thick film portion is formed on the orientation film 114, as shown in FIG. 4, the thickness of the orientation film 114 and liquid crystal layer 104 becomes nonuniform, and fluctuations occur in the voltage-transmission characteristics of the liquid crystal. Display nonuniformity occurs as a result. Thus, when the orientation film 114 has a thick film portion, thin film transistors and other switching elements 115 must be disposed so as to avoid the thick film portions in order to prevent display defects from being created by the presence of the thick film portions. For this reason, the conventional liquid crystal display device shown in FIG. 4 has a problem in that the frame width L becomes wider by an amount equal to the thick film portion, and narrow framing is difficult.

FIG. 5 is a cross-sectional diagram showing the state of the orientation film after rubbing treatment, on which a thick film portion is present. When a thick film portion is present on the orientation film 114, as shown in FIG. 5, there is a problem in that dust 118 generated from the thick film portion spreads to the display area 106 when the orientation film 114 is rubbed, and display defects are created.

In the same manner as in the liquid crystal display device described in Japanese Laid-Open Patent Application No. 10-123571 shown in FIGS. 2 and 3, when the protective film 122 and smoothed film 123 are removed from portions other than the display area 106 in order to form a recess 107, the wiring (not shown) for the feeding voltage that drives the switching elements 125 and the transparent substrate 121 composed of glass or the like are exposed. When the wiring is exposed, for example, the wiring is liable to be damaged when the orientation film 124 is subjected to the rubbing treatment step, the spacer dispersion step, and other steps. Also, when the transparent substrate 121 is exposed, impurities from the transparent substrate 121 are dispersed in the liquid crystal layer 104, and display defects are liable to occur. When a recess 107 is formed by removing the protective film 122 and the smoothed film 123 in this fashion, there is a problem in that reliability is reduced.

When the configuration shown in FIG. 2 is applied to a liquid crystal display device formed with peripheral drive circuits further inward from the seal member 103, there is a problem in that the drive circuits are liable to be damaged in the rubbing treatment step, the spacer dispersion step, and other steps, because the smoothed film formed on the peripheral drive circuits must be removed.

SUMMARY OF THE INVENTION

An object of the present invention is to provide a liquid crystal display panel and a liquid crystal display device that can reduce the liquid crystal injection time and can be set in a narrow frame, and in which the wiring and peripheral drive circuits are not liable to be damaged.

The liquid crystal display panel according to a first aspect of the present invention has a first substrate, a second substrate disposed facing the first substrate, a liquid crystal layer sealed between the first and second substrates, and an orientation film which is disposed on the surface of the liquid crystal layer side of at least one substrate selected from the first and second substrates, and which orients the liquid crystal molecules of the liquid crystal layer. The substrate on which the orientation film is formed is provided with a recess across the entire area or locally in the portion corresponding to the peripheral edge portion of the orientation film. At least a part the peripheral edge portion of the orientation film is formed inside the recess.

In the present invention, since the periphery of the orientation film is formed on a recess, the orientation material of the thick film area of the orientation film formed on the edge of the orientation film is absorbed by the recess, bulging on the surface of the periphery of the orientation film does not occur, and the cell gap can be prevented from becoming narrow. More specifically, since liquid pools of orientation material solution produced at the edge of the orientation film immediately after orientation film printing flow into the recess, the surface of the orientation film can be made smooth. As a result, the liquid crystal injection time is reduced and productivity can be increased because the flow rate resistance is reduced when liquid material is injected. Since the periphery of the orientation film does not have a thick film area and the thickness of the orientation film and the cell gap are made uniform, the voltage-transmission characteristics of the liquid crystal layer can be made uniform across the entire display area, and the generation of display defects can be prevented. Display defects can furthermore be reduced because rubbing dust produced in the orientation film rubbing treatment can be prevented. Since the surface of the orientation film can be made smooth and the entire surface of the orientation film can be used as a display area, narrow framing is made possible.

Pixel circuits for applying voltage to the liquid crystal layer may be disposed on the first substrate, the orientation film may be formed on the pixel circuits by way of an insulation film, and thin film transistors may be disposed in the pixel circuits. In this case, the insulation film may have an interlayer insulation film and a smoothed film whose thickness is greater than that of the interlayer insulation film formed on the interlayer insulation film, and an aperture may be formed in the smoothed film in at least a portion of the area directly below the peripheral edge portion of the orientation film. Since the surface of the orientation film or the pixel circuits can thereby be protected by the interlayer insulation film, the orientation film can be subjected to rubbing treatment, spacer scattering treatment, and other treatments without damaging the pixel circuits.

A plurality of wires electrically connected to the pixel circuits may be disposed on the first substrate, the wires may be formed in the area directly below the peripheral edge portion of the orientation film, and the apertures may be formed in portions other than directly below the wires. Since the pixel circuits can thereby be protected by both the interlayer insulation film and the smoothed film, the effect of preventing damage to the pixel circuits is enhanced.

A drive circuit for driving the pixel circuits may be disposed on the first substrate, and the insulation film is also formed on the drive circuit. Mechanical damage to the drive circuit can thereby be prevented.

The second substrate may be provided with a color layer on the surface side on which the liquid crystal layer is formed, and a topcoat layer for covering the color layer and the orientation film may be formed on the topcoat layer. In this case, an aperture may be formed in the topcoat layer in at least a portion of the area directly below the peripheral edge portion of the orientation film. Since the orientation material of the thick film area of the orientation film formed on the edge of the orientation film is absorbed by the recess, formation of a thick film area of the orientation film can be suppressed.

A liquid crystal display device according to a second aspect of the present invention has the liquid crystal display panel described above.

In accordance with the present invention, since the periphery of the orientation film is formed on the recess, formation of a thick film area on the orientation film can be prevented, the narrow portion of the cell gap is reduced, the liquid crystal injection time can be shortened, and narrow framing is possible because the surface of the orientation film is made smooth. Damage to the wiring and peripheral drive circuit can furthermore be prevented because an orientation film is formed on the wiring and the peripheral drive circuit.

DESCRIPTION OF THE PREFERRED EMBODIMENTS

Figure 6:
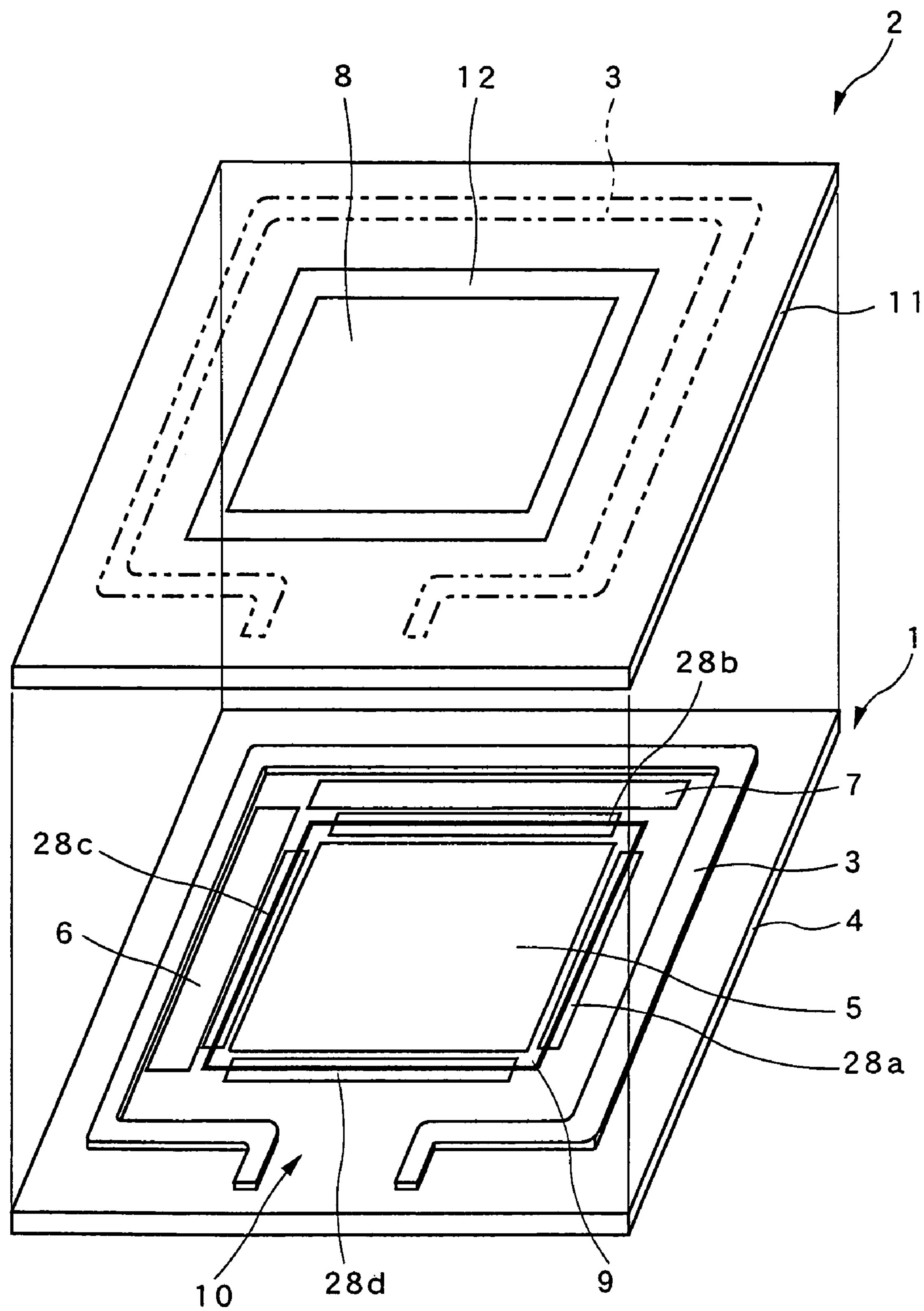
FIG. 6 is an exploded perspective view schematically showing the liquid crystal display device of the first embodiment of the present invention.
Figure 7:
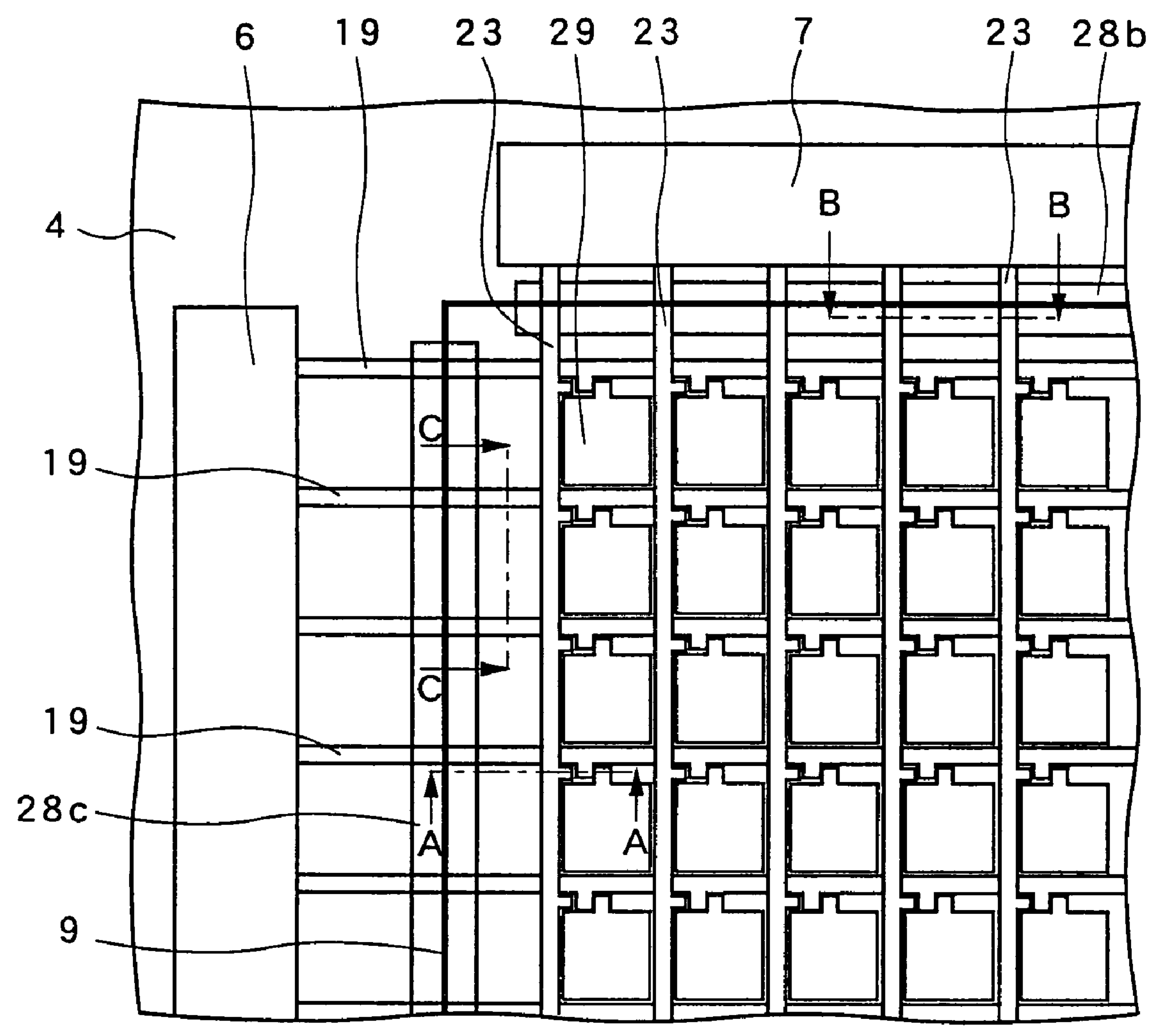
FIG. 7 is an enlarged plan view of the drive substrate of the liquid crystal display device of the first embodiment of the present invention.
Figure 8:
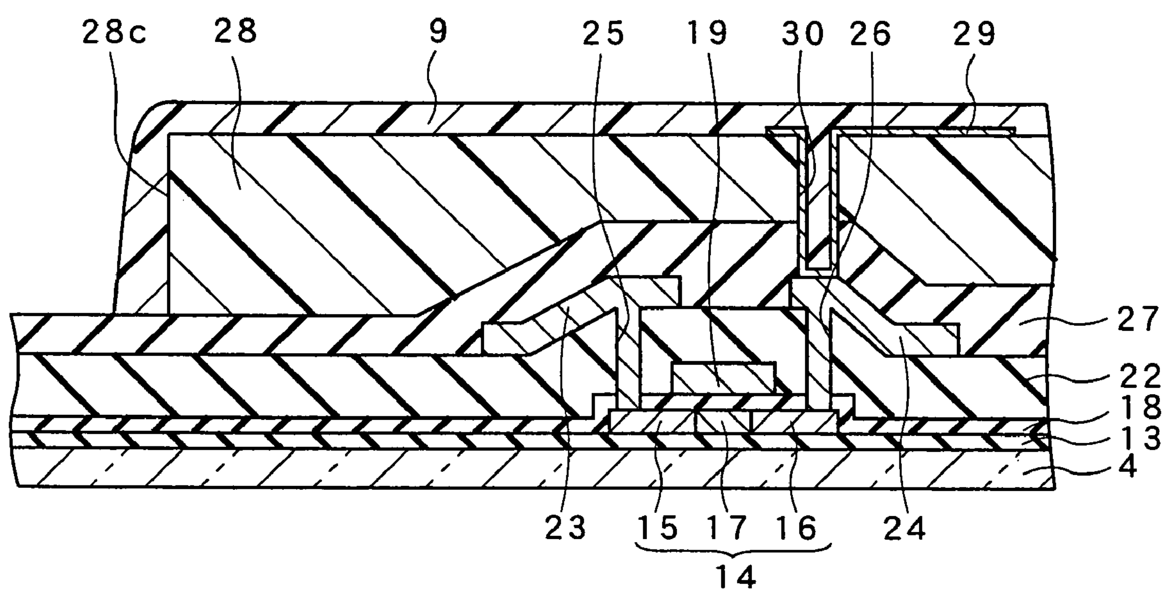
FIG. 8 is a cross-sectional diagram along the line A-A shown in FIG. 7.
Figure 9:
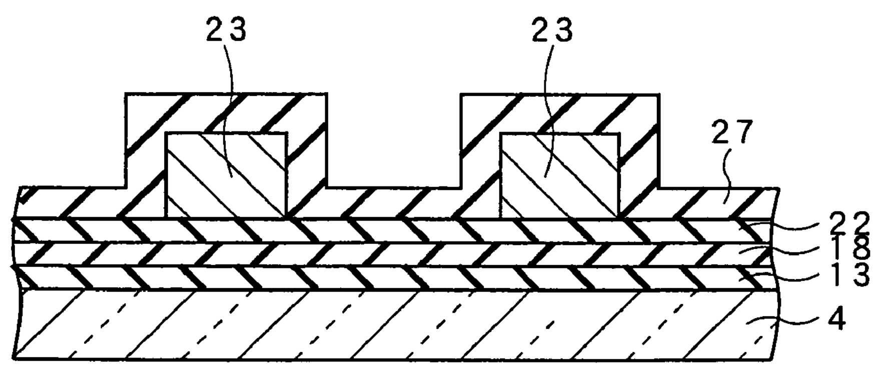
FIG. 9 is a cross-sectional diagram along the line B-B shown in FIG. 7.
Figure 10:
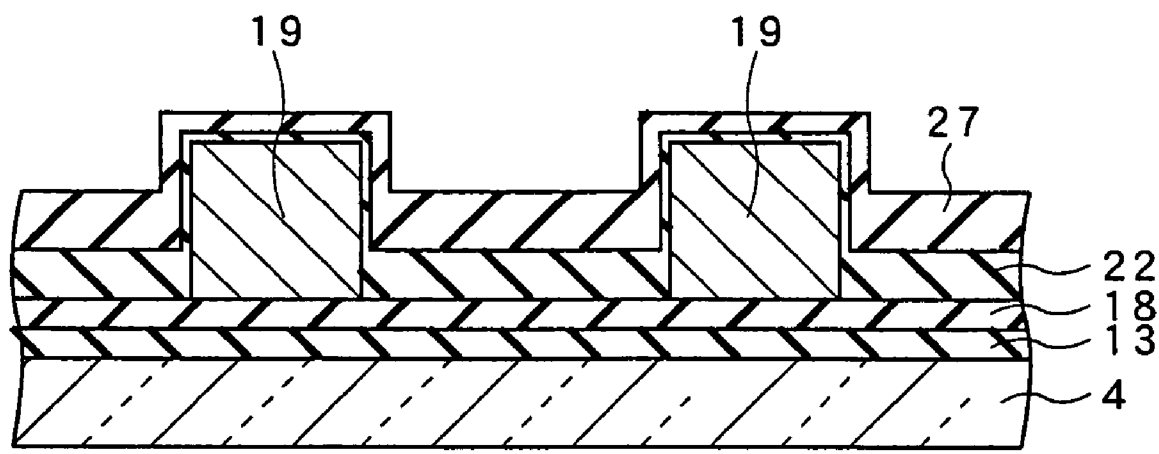
FIG. 10 is a cross-sectional diagram along the line C-C shown in FIG. 7.

The liquid crystal display device according to the embodiments of the present invention is described in detail below with reference to the attached diagrams. Described first is the liquid crystal display device according to the first embodiment of the present invention. FIG. 6 is an exploded perspective view schematically showing the liquid crystal display device of the present embodiment, and FIG. 7 is an enlarged plan view of the drive substrate thereof. FIG. 8 is a cross-sectional diagram along the line A-A shown in FIG. 7, FIG. 9 is a cross-sectional diagram along the line B-B, and FIG. 10 is a cross-sectional diagram along the line C-C. The liquid crystal display device of the present embodiment is configured with a drive substrate 1 and an opposing substrate 2 disposed parallel to each other by way of a seal member 3 provided with a liquid crystal injection inlet 10, as shown in FIG. 6, and a liquid crystal layer is sealed between the two substrates.

The drive substrate 1 in the liquid crystal display device is provided with a transparent substrate 4 composed of glass or another material, and a pixel area 5 in which a plurality of polysilicon thin film transistors for driving pixels are arranged in the form of a matrix is disposed on the surface of the side facing the opposing substrate 2 in the transparent substrate 4. Specifically, a subsurface insulation film 13 is formed on the transparent substrate 4, and a semiconductor layer 14 composed of a polysilicon layer, in which a source area 15 and a drain area 16 are formed, is formed into a matrix on the subsurface insulation film 13, as shown in FIGS. 7 to 10. The area between the source area 15 and the drain area 16 in the semiconductor layer 14 is a channel area 17.

A gate insulation film 18 is formed on the subsurface insulation film 13 so as to cover the semiconductor layer 14, and a plurality of gate electrodes 19 extending in the lateral direction 20 and passing directly over the channel area 17 of the semiconductor layers 14 are formed parallel to each other on the gate insulation film 18. An interlayer insulation film 22 is also formed on the gate insulation film 18 so as to cover the gate electrodes 19. A plurality of source electrodes 23 and drain electrodes 24 extending in the longitudinal direction 21 are formed parallel to each other on the interlayer insulation film 22. The source electrodes 23 and drain electrodes 24 are formed inside the contact holes 25 and 26 that are formed completely through both the gate insulation film 18 and the interlayer insulation film 22, and the source areas 15 and drain areas 16 of the semiconductor layers 14 are thereby connected.

An interlayer insulation film 27 is formed on the interlayer insulation film 22 so as to cover the source electrodes 23 and drain electrodes 24, and a smoothed film 28 is formed on the interlayer insulation film 27. Apertures 28*a* to 28*d* are formed on the smoothed film 28 along the periphery of the pixel area 5. A plurality of pixel electrodes 29 consisting of transparent electroconductive film are formed as a matrix on the smoothed film 28, and the pixel electrodes 29 are formed inside contact holes 30 that are formed completely through both the smoothed film 28 and the interlayer insulation film 27, and the drain electrodes 24 are thereby connected.

A gate electrode drive circuit 6 and a source electrode drive circuit 7 are formed between the seal member 3 and the pixel area 5 configured in the manner described above. The polysilicon thin film transistors formed in the pixel area 5 are connected to the gate electrode drive circuit 6 via the gate electrodes 19 and are connected to the source electrode drive circuit 7 via the source electrodes 23. An orientation film 9 is formed on the drive substrate 1 so as to cover the pixel area 5 and so that the periphery thereof is positioned inside the apertures 28*a* to 28*d* formed in the smoothed film 28. Spacers (not shown) for making the gaps uniform are distributed on the orientation film 9.

A transparent substrate 11 composed of glass or the like is disposed on an opposing substrate 2. A color layer 8 is formed on the surface of the side facing the drive substrate 1 in the transparent substrate 11, above the area matching the pixel area 5. A topcoat layer 12 is formed so as to cover the color layer 8.

Figure 11A:
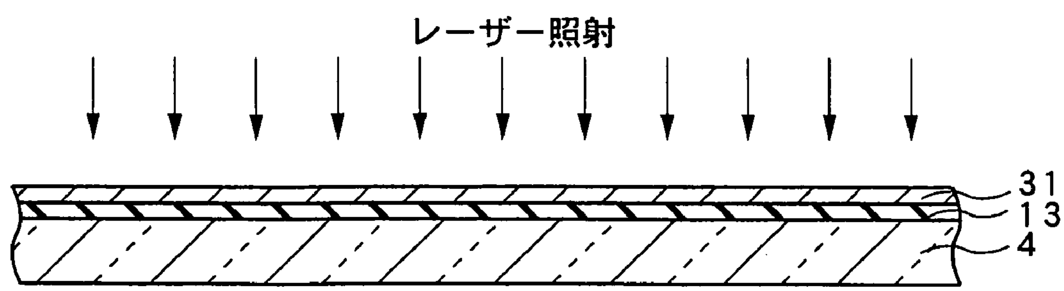
FIGS. 11A to 11J are cross-sectional diagrams showing the step sequence of the method for forming a pixel area in the liquid crystal display device of the first embodiment of the present invention.

Described next is the manufacturing method of the liquid crystal display device of the present embodiment. FIGS. 11A to 11J are cross-sectional diagrams showing the step sequence of the method for forming a pixel area in the liquid crystal display device of the present embodiment. The manufacturing method of the drive substrate is described first. The subsurface insulation film 13 is formed on the transparent substrate 4 composed of glass or the like, and an amorphous silicon film 31 is then grown on the subsurface insulation film 13, as shown in FIG. 11A. The amorphous silicon film 31 is then annealed by laser irradiation to form a polysilicon film.

Figure 11B:
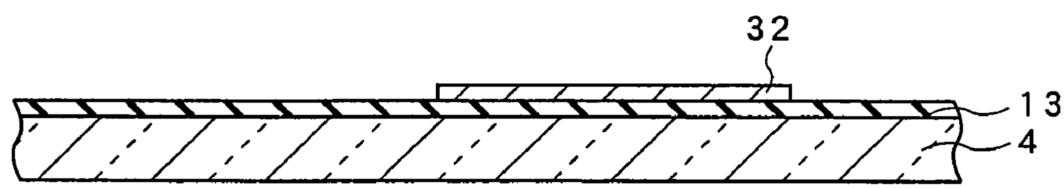
Figure 11C:
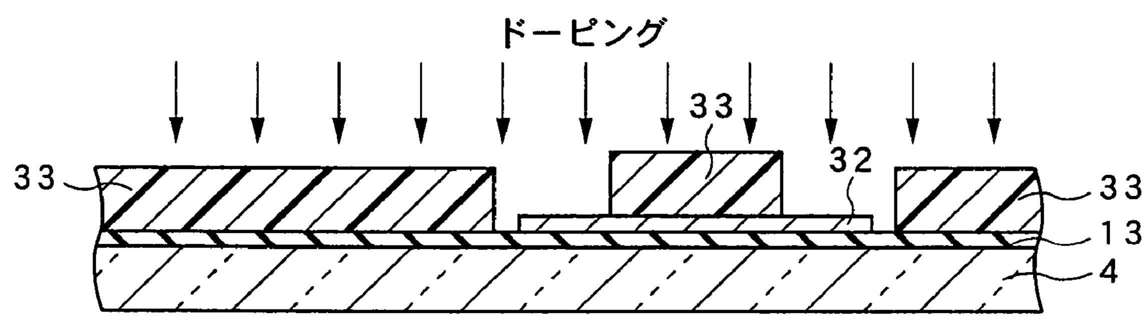
Figure 11D:
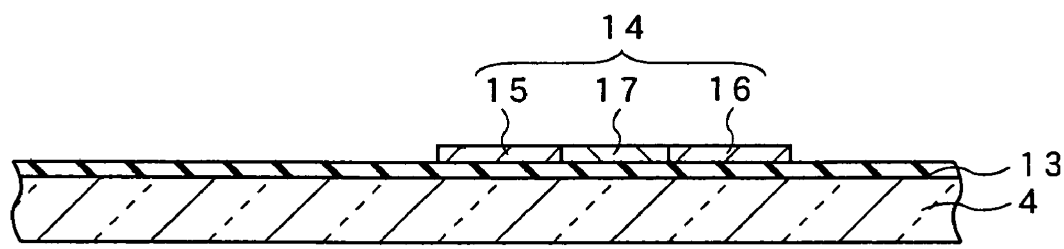

Next, the polysilicon film 32 is divided into a plurality of areas arranged in a matrix by using a photolithography step, as shown in FIG. 11B. A photoresist 33 is subsequently patterned so that apertures are formed in the source and drain planned formation areas of the photoresist 33 by using a photolithography step, as shown in FIG. 11C. The polysilicon film 32 is thereafter masked and the polysilicon films are subjected to ion doping. The photoresist 33 is then removed, as shown in FIG. 11D. A semiconductor layer 14 provided with a source area 15 and drain area 16 is formed thereby. The area between the source area 15 and drain area 16 in the semiconductor layer 14 is a channel area 17.

Figure 11E:
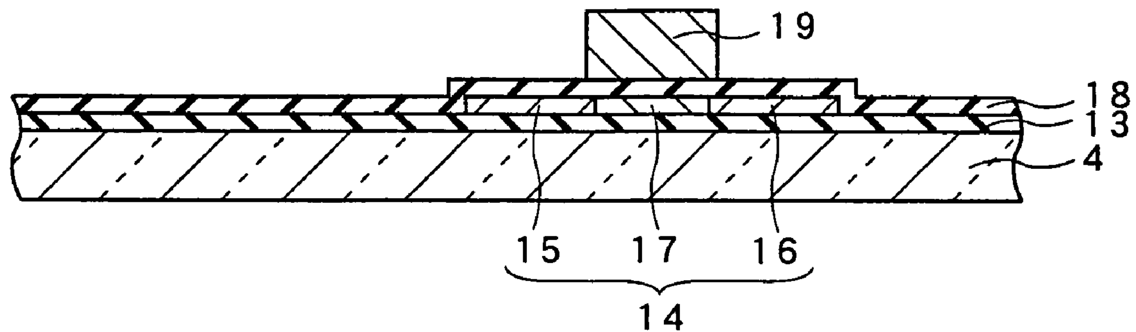
Figure 11F:
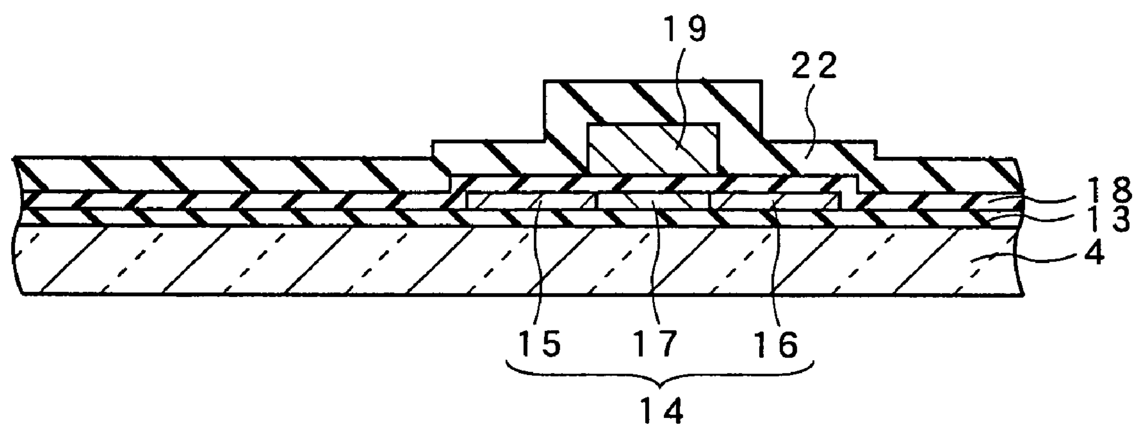

A gate insulation film 18 is subsequently formed so as to cover the subsurface insulation film 13 and the semiconductor layers 14 formed thereon, as shown in FIG. 11E. A metal film is then formed on the gate insulation film 18, and a plurality of gate electrodes 19 extending in the lateral direction 20 and passing directly over the channel area 17 of the semiconductor layers 14 are formed on the gate insulation film 18 by patterning the metal film in a photolithography step.

Figure 11G:
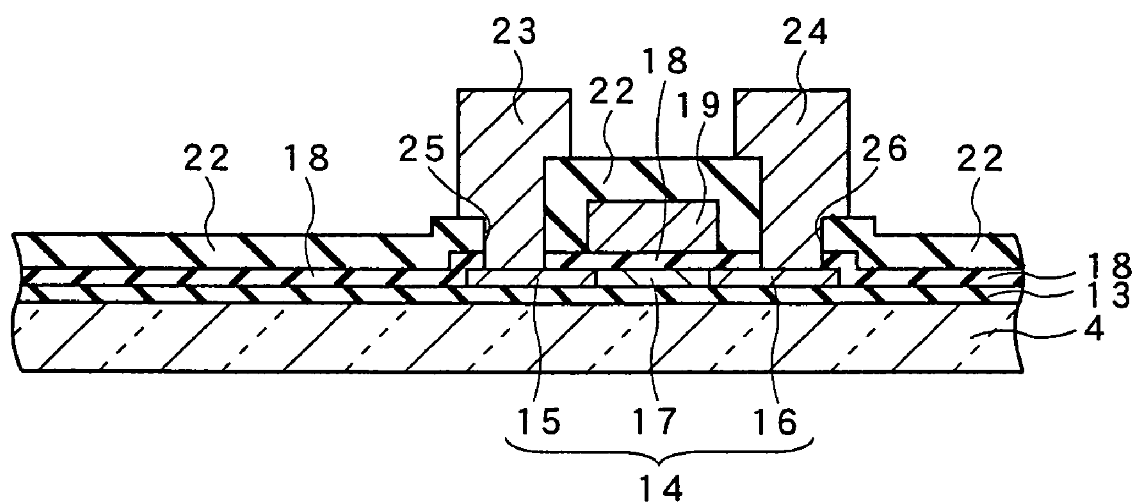

Next, contact holes 25 and 26 are formed completely through both the interlayer insulation film 22 and the gate insulation film 18 in the area directly above the source area 15 and drain area 16, as shown in FIG. 11G, and the surface of the source area 15 and drain area 16 is exposed. A metal film is thereafter formed inside the contact holes 25 and 26 and on the interlayer insulation film 22, and the metal film is then patterned to form a plurality of source electrodes 23 electrically connected to the source area 15 extending in the longitudinal direction 21, and a plurality of drain electrodes 24 electrically connected to the drain area 16 extending in the longitudinal direction 21.

Figure 11H:
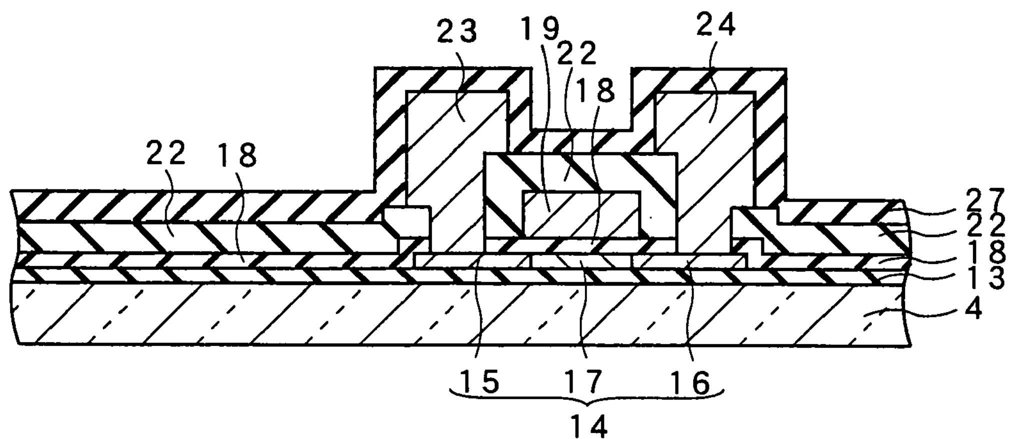
Figure 11I:
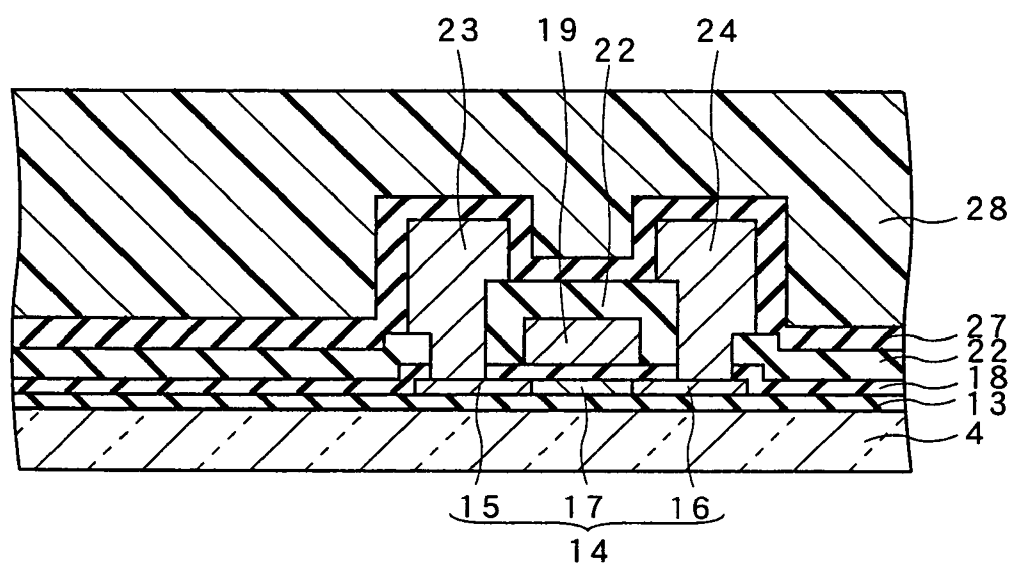

An interlayer insulation film 27 is subsequently formed so as to cover the interlayer insulation film 22, source electrodes 23, and drain electrodes 24, as shown in FIG. 11H. The interlayer insulation film 27 is preferably formed with an inorganic material so as to avoid a reaction with the metal material that forms the source electrodes 23 and drain electrodes 24. Since the surface is thereafter smoothed, a smoothed film 28 composed of resin or the like is formed on the interlayer insulation film 27, as shown in FIG. 11I.

Figure 11J:
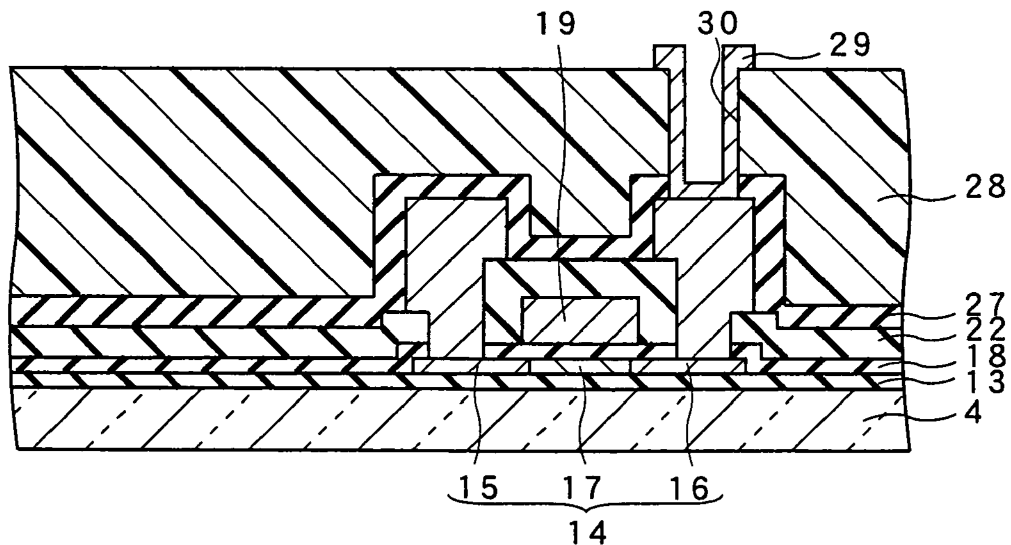

Contact holes 30 are formed completely through the smoothed film 28 and the interlayer insulation film 27 in the area directly above the drain electrodes 24, and the surface of the drain electrodes 24 is exposed, as shown in FIG. 11J. A transparent electroconductive film composed of ITO (Indium Tin Oxide) or the like is then formed on the smoothed film 28 and inside the contact holes 30, and the transparent electroconductive film is thereafter patterned and arranged as a matrix to form pixel electrodes 29 electrically connected to the drain electrodes 24.

The gate electrode drive circuit 6 and source electrode drive circuit 7 are formed on the periphery of the pixel area 5 on the transparent substrate 1, that is, portions other than the display area, as shown in FIG. 7. The gate electrode drive circuit 6 and source electrode drive circuit 7 are formed, the gate electrode drive circuit 6 and gate electrodes 19 are electrically connected, and the source electrode drive circuit 7 and the source electrodes 23 are also electrically connected by the same method shown in FIGS. 11A to 11J.

Next, a portion of the smoothed film 28 is removed from along the periphery of the pixel area 5, and apertures 28*a* to 28*d* are formed in the smoothed film 28, as shown in FIG. 6. An orientation film 9 is then formed using flexographic printing method so as to cover the pixel area 5. In this procedure, the periphery of the orientation film 9 is positioned inside the apertures 28*a* to 28*d*. The surface of the orientation film 9 is then rubbed in the direction in which the liquid crystals are to be oriented, and spacers are distributed on the orientation film 9 in order to make the gaps uniform. Next, a seal member 3 is formed so as to surround the drive circuits 6 and 7, the pixel area 5, and the orientation portions 8*a* to 8*d* formed on the periphery thereof. At this point, a liquid crystal injection inlet 10 is disposed in a portion of the seal member 3.

Described next is the manufacturing method for the opposing substrate 2 shown in FIG. 6. The opposing substrate 2 has a color layer 8 formed in the area that matches the pixel area 5 on the transparent substrate 11 composed of glass or the like. A topcoat layer 12 is formed so as to cover the color layer 8.

The drive substrate 1 and an opposing substrate 2 formed in the manner described above are superimposed, liquid crystal material is injected from the liquid crystal injection inlet 10, and the liquid crystal injection inlet 10 is sealed with a sealant to form a liquid crystal display device.

Figure 4:
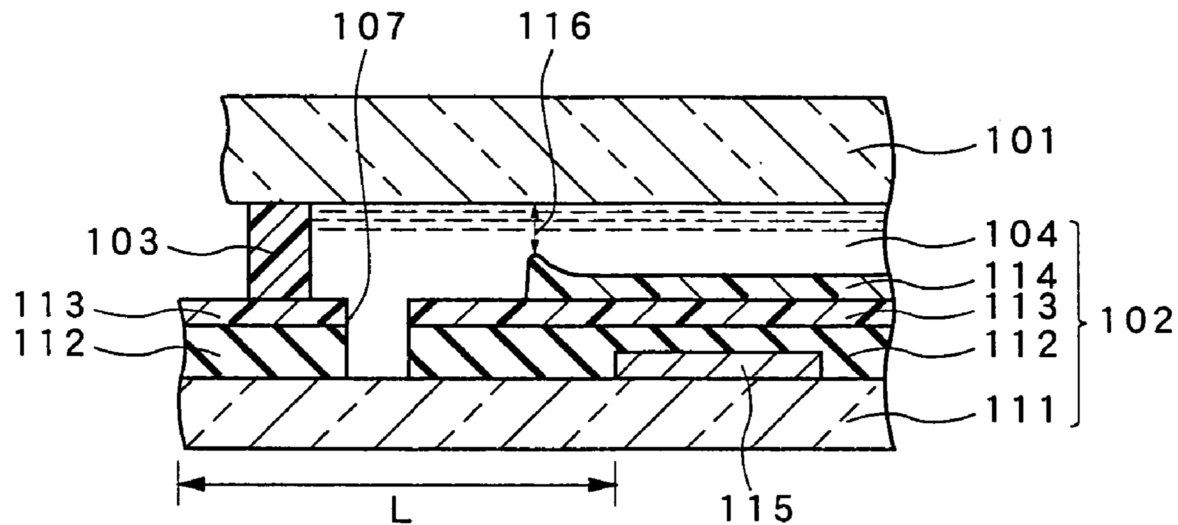
FIG. 4 is a cross-sectional diagram showing the thick film portion of the orientation film.

In the liquid crystal display device of the present embodiment, since apertures 28*a* to 28*d* are disposed in the smoothed film 28, as shown in FIG. 6, and the orientation film 9 is formed so that the edge is positioned at the apertures 28*a* to 28*d*, a thick film portion is not formed at the edge of the orientation film 9, and a narrow gap portion 116 such as that shown in FIG. 4 is not produced even if the orientation film 9 is formed by printing. As a result, the liquid crystal injection time can be shortened in comparison with a conventional liquid crystal display device because the flow rate resistance is reduced when liquid material is injected.

Figure 5:
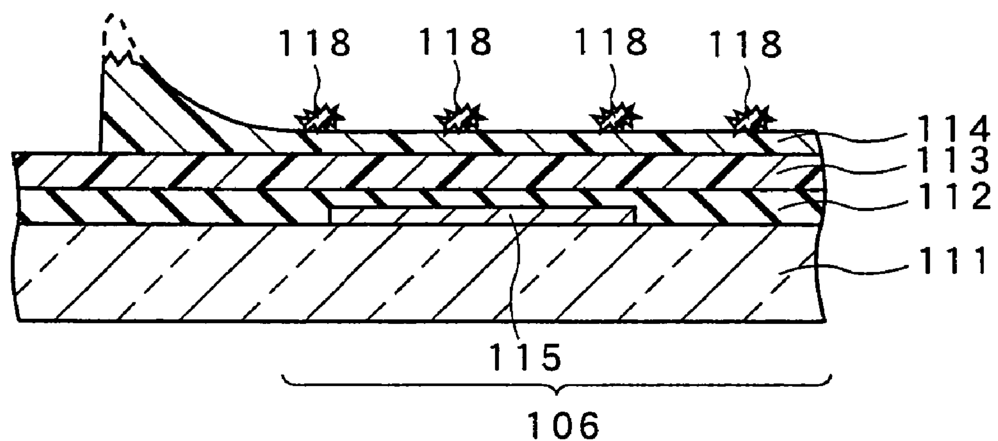
FIG. 5 is a cross-sectional diagram showing the state of the orientation film after rubbing treatment, on which a thick film portion is present.

In the liquid crystal display device of the present embodiment, since a thick film portion is not formed at the edge of the orientation film 9, the voltage-transmission characteristics can be made uniform within the display area, display unevenness is suppressed, and the display quality is improved. Display defects caused by dust generated during rubbing treatment can furthermore be reduced as shown in FIG. 5.

Figure 1:
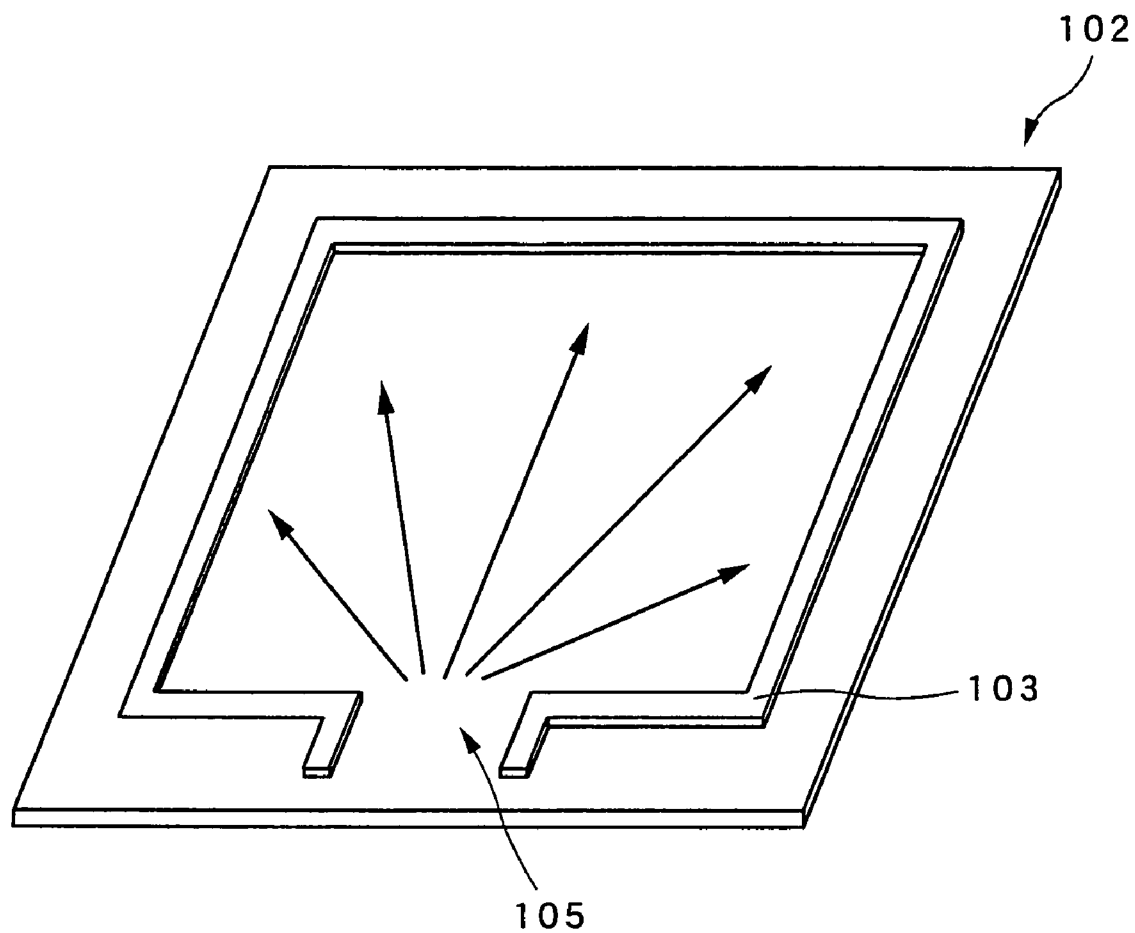
FIG. 1 is a diagram that schematically shows a conventional liquid crystal injection method.
Figure 2:
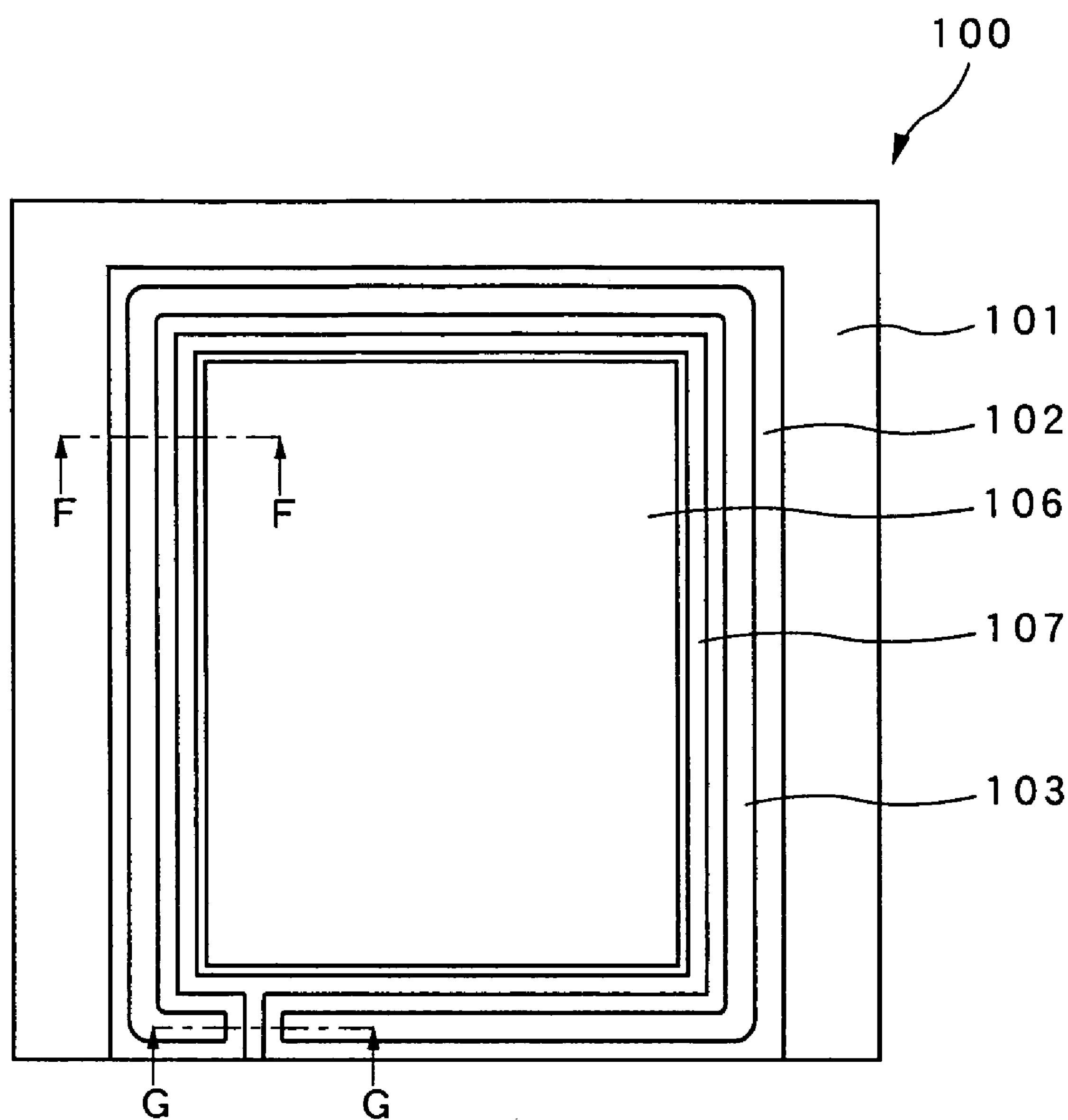
FIG. 2 is a plan view that schematically shows the liquid crystal display device described in Japanese Laid-Open Patent Application No. 10-123571.
Figure 3A:
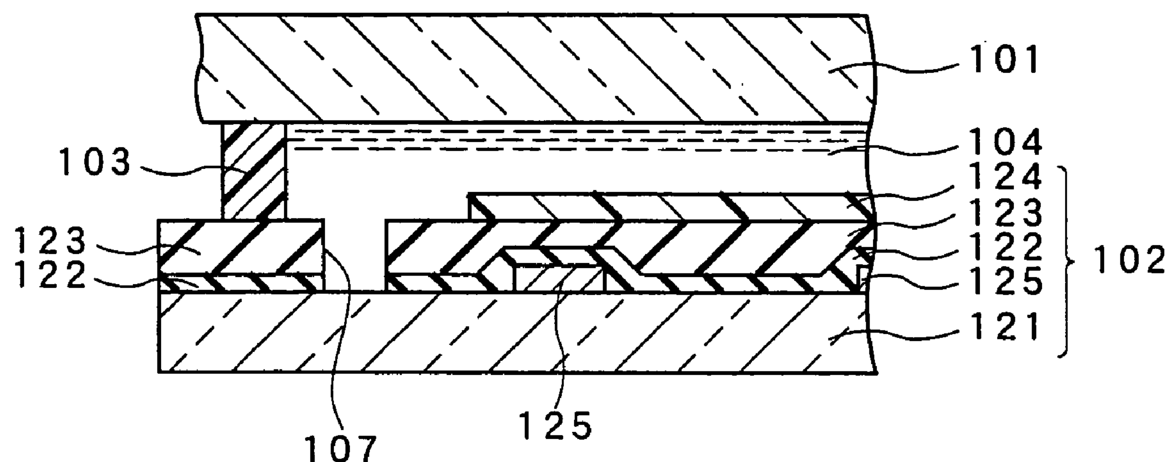
FIG. 3A is a cross-sectional view along the line F-F shown in FIG. 2.
Figure 3B:
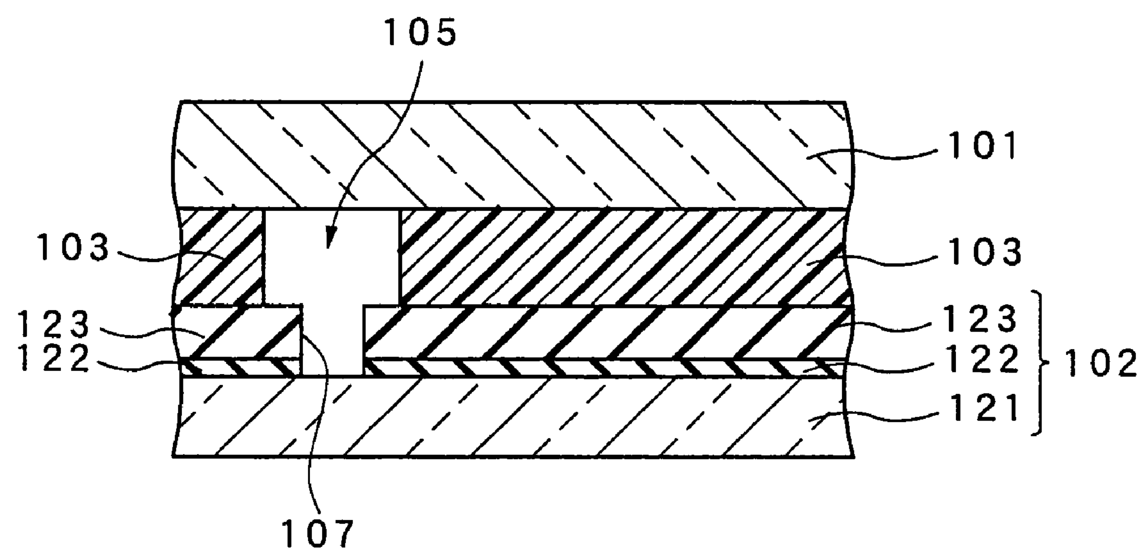
FIG. 3B is a cross-sectional view along the line G-G shown in FIG. 2.
Figure 12:
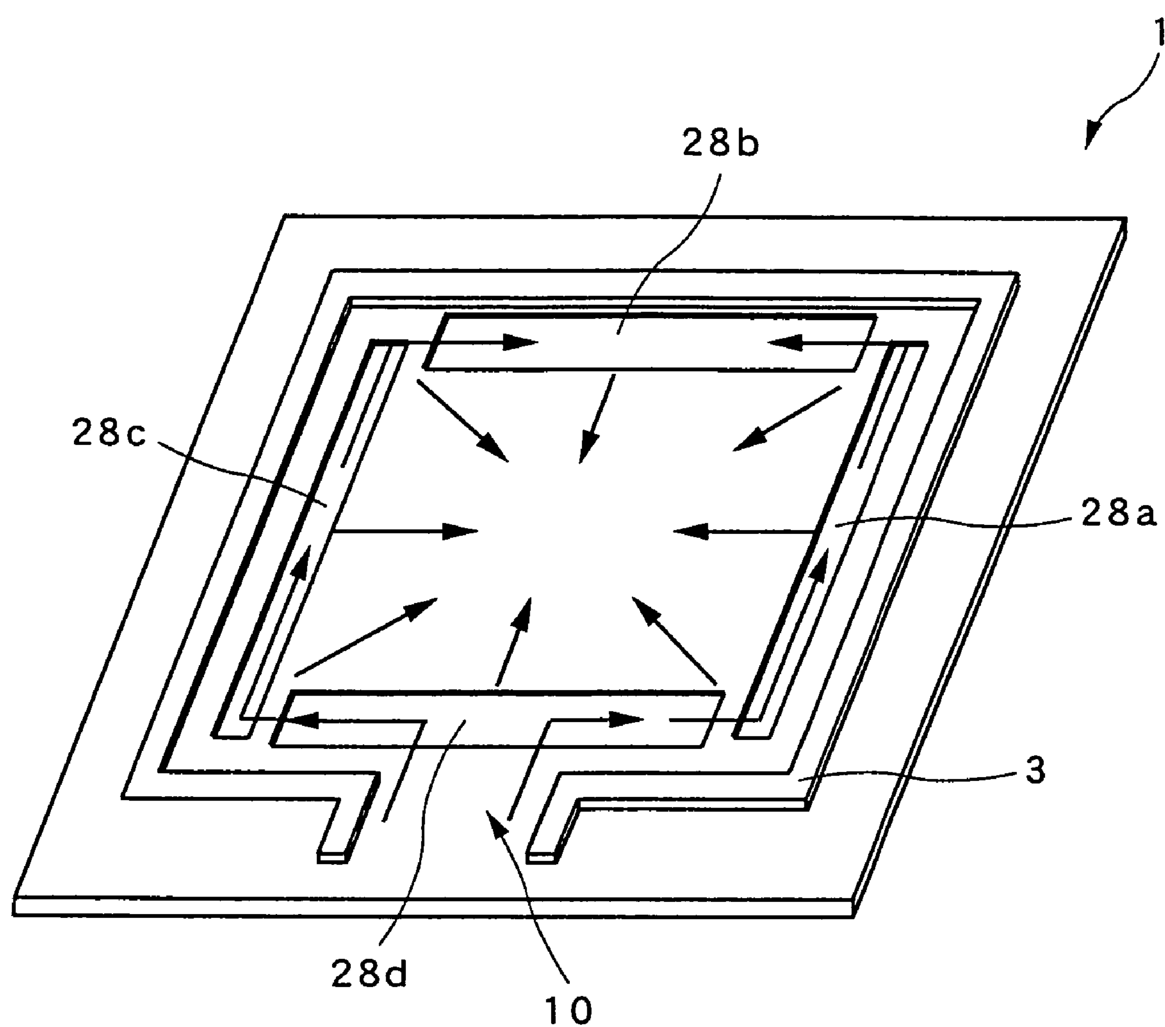
FIG. 12 is a diagram showing the flow of the liquid crystal material during liquid crystal injection in the liquid crystal display device of the first embodiment of the present invention.

FIG. 12 is a diagram showing the flow of the liquid crystal material during liquid crystal injection in the liquid crystal display device of the present embodiment. Since the liquid crystal display device of the present embodiment is provided with apertures 28*a* to 28*d* along the periphery of the pixel area 26, as shown in FIG. 12, a liquid crystal injection inlet is formed so as to surround the pixel area 26, and the liquid crystal injection step can be completed with greater speed than the conventional liquid crystal display device shown in FIG. 1.

In the liquid crystal display device of the present embodiment, since the source electrodes 23 and gate electrodes 19 are covered by an interlayer insulation film, even in the portions in which the apertures 28*a* to 28*d* are formed, as shown in FIGS. 9 and 10, the wiring can be protected from mechanical impact when the orientation film 9 is being rubbed.

Figure 13:
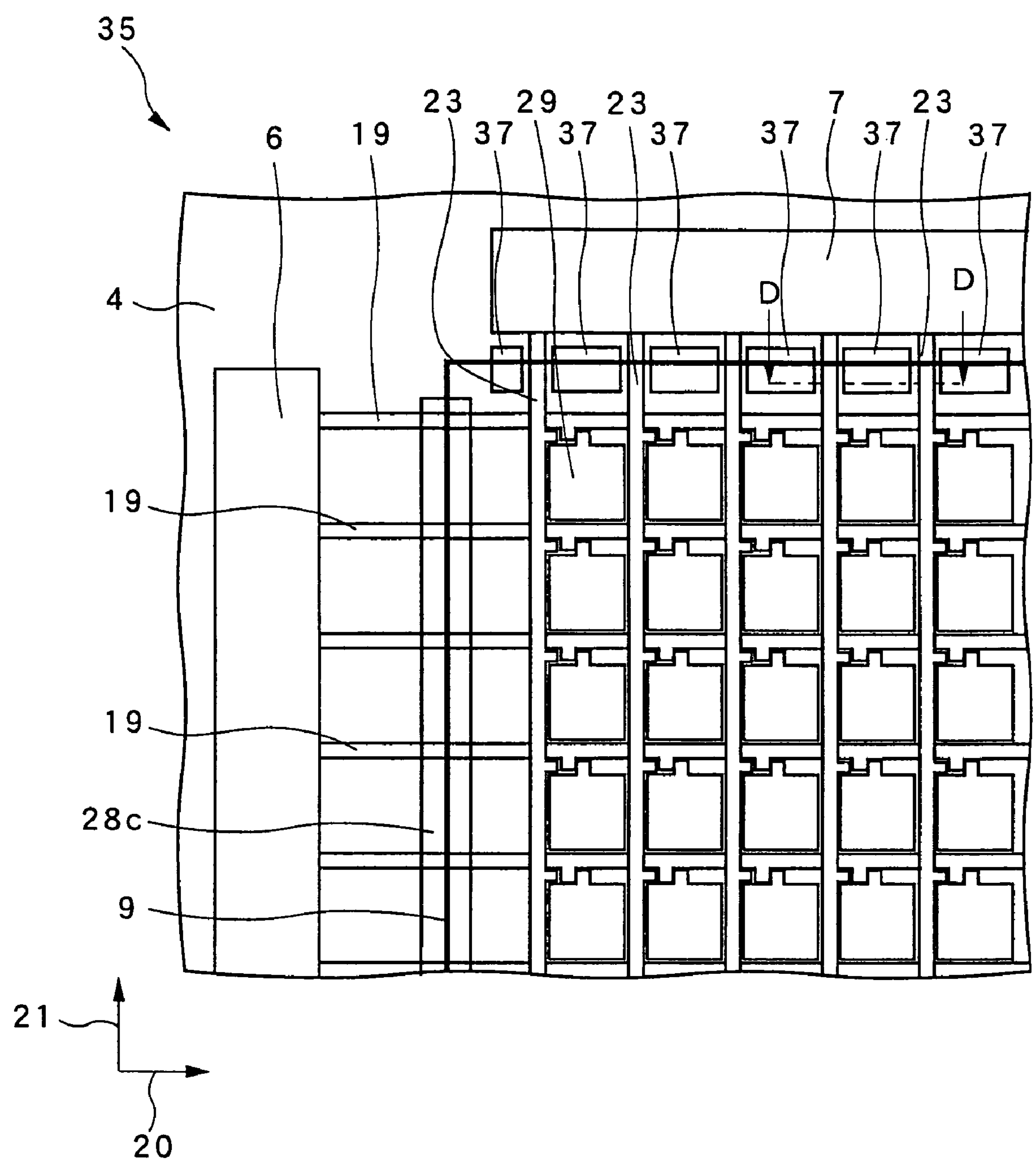
FIG. 13 is an enlarged plan view of the drive substrate of the liquid crystal display device of the second embodiment of the present invention.
Figure 14:
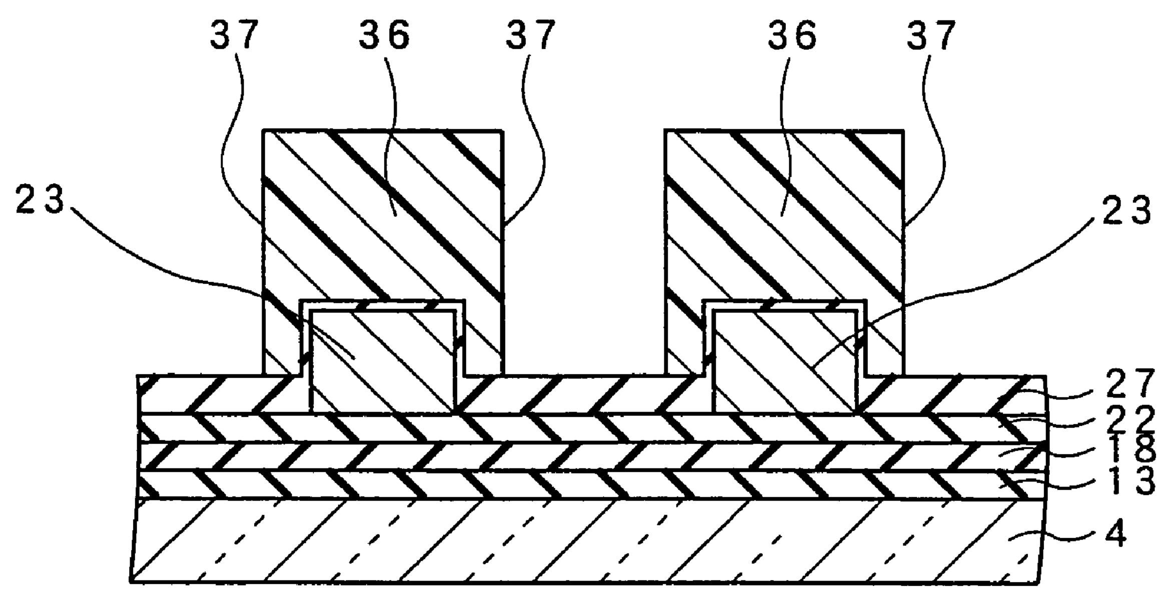
FIG. 14 is a cross-sectional diagram along the line D-D shown in FIG. 13.

Described next is the liquid crystal display device of the second embodiment of the present invention. In the same manner as the liquid crystal display device of the first embodiment described above, the liquid crystal display device of the present embodiment is provided with a liquid crystal display panel in which a drive substrate and an opposing substrate are disposed parallel to each other by way of a seal member wherein a liquid crystal injection inlet is disposed, and a liquid crystal layer is sealed between the two substrates. FIG. 13 is an enlarged plan view of the drive substrate of the liquid crystal display device of the present embodiment, and FIG. 14 is a cross-sectional diagram along the line D-D thereof. In FIGS. 13 and 14, the same reference numerals are assigned to the same constituent components of the liquid crystal display device of the first embodiment shown in FIGS. 6 to 10, and a detailed description thereof is omitted. The drive substrate 35 in the liquid crystal display device of the present embodiment is configured with a plurality of apertures 37 that are formed away from the area directly above the source electrodes 23, in lieu of the apertures 28*a* to 28*d* shown in FIG. 7, as shown in FIGS. 13 and 14. In other words, the drive substrate 35 is configured so that apertures are not disposed in the area directly above the source electrodes 23, but a smoothed film 36 is formed on the source electrodes 23.

When the thickness of the interlayer insulation film 27 is less than the thickness of the source electrodes 23, as shown in FIG. 14, the source electrodes 23 are not liable to be protected by the interlayer insulation film 27 alone, but since the liquid crystal display device of the present embodiment does not involve removal of the smoothed film 36 in the area directly above the source electrodes 23 and the periphery thereof, the source electrodes 23 can be reliably protected. Also, since apertures 37 are formed in the drive substrate 35 above the area between the source electrodes 23, a thick film portion is not formed in the orientation film. The configuration and effects, other than those described above in connection with the liquid crystal display device of the present embodiment, are the same as those of the liquid crystal display device of the first embodiment described above.

Figure 15:
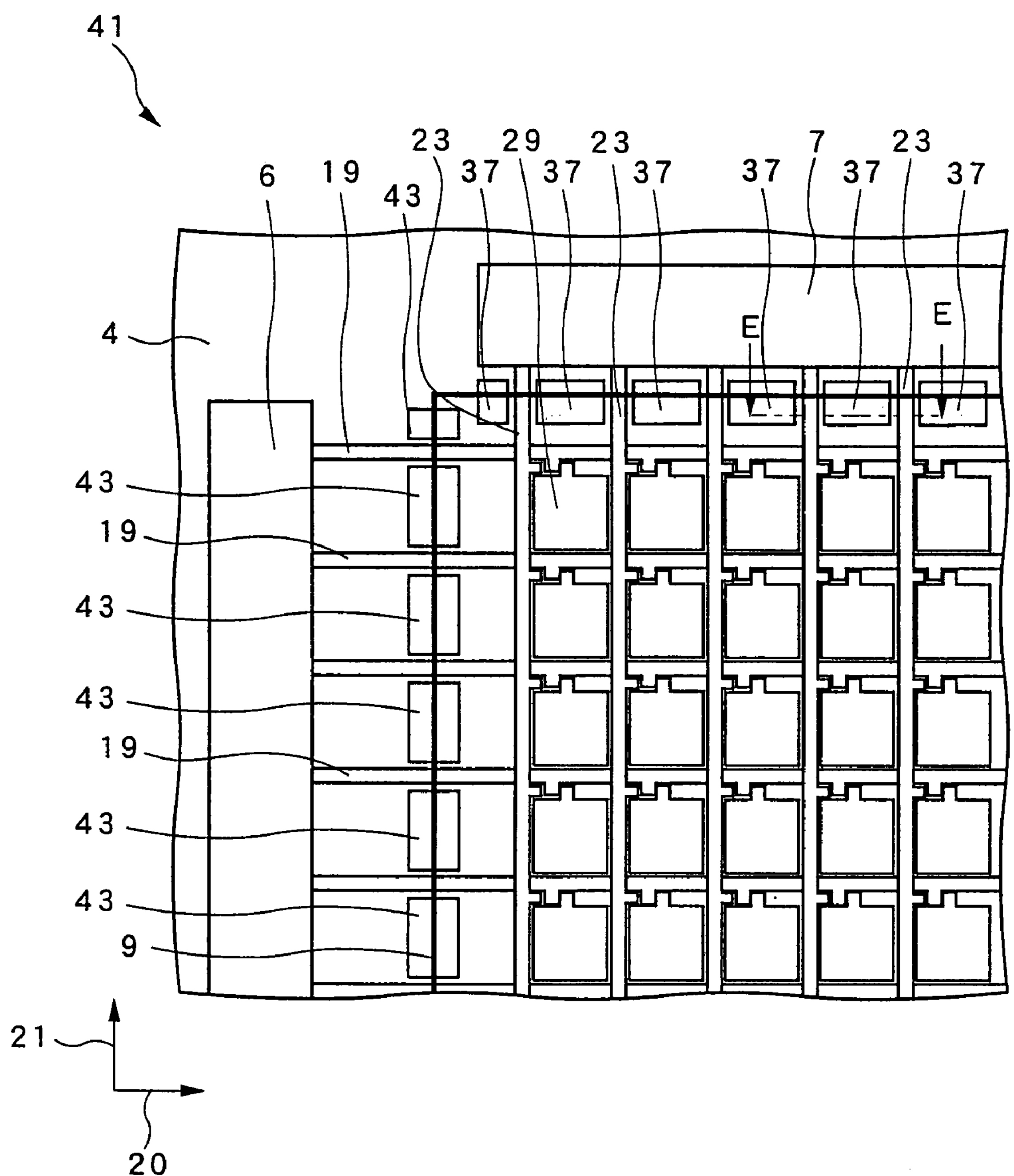
FIG. 15 is an enlarged plan view of the drive substrate of the liquid crystal display device of the third embodiment of the present invention.
Figure 16:
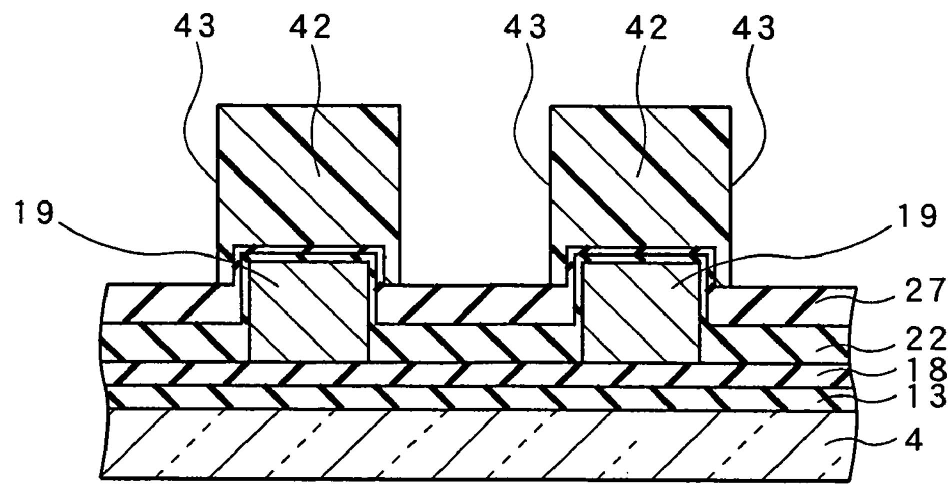
FIG. 16 is a cross-sectional diagram along the line E-E shown in FIG. 15.

Described next is the liquid crystal display device of the third embodiment of the present invention. In the same manner as the liquid crystal display device of the first and second embodiments described above, the liquid crystal display device of the present embodiment is provided with a liquid crystal display panel in which a drive substrate and an opposing substrate are disposed parallel to each other by way of a seal member wherein a liquid crystal injection inlet is disposed, and a liquid crystal layer is sealed between the two substrates. FIG. 15 is an enlarged plan view of the drive substrate of the liquid crystal display device of the present embodiment, and FIG. 16 is a cross-sectional diagram along the line E-E thereof. In FIGS. 14 and 15, the same reference numerals are assigned to the same constituent components as those of the liquid crystal display device of the first embodiment shown in FIGS. 6 to 10, and a detailed description thereof is omitted.

Other than configuring the drive substrate 41 in the liquid crystal display device of the present embodiment with a plurality of apertures 43 that are formed away from the area directly above the gate electrodes 19, in lieu of the apertures 28*a* to 28*c*, as shown in FIGS. 15 and 16, the configuration is the same as the drive substrate 35 shown in FIG. 13. In other words, the drive substrate 41 is configured so that apertures are not disposed in the area directly above the gate electrodes 19 and source electrodes 23, but a smoothed film 36 is formed on the gate electrodes 19 and source electrodes 23.

When the thickness of the interlayer insulation films 22 and 27 is less than the thickness of the gate electrodes 19, as shown in FIG. 16, the gate electrodes 19 are not liable to be protected by the interlayer insulation films 22 and 27 alone, but since the liquid crystal display device of the present embodiment does not involve removal of the smoothed film 42 in the area directly above the gate electrodes 19 and the periphery thereof, the gate electrodes 19 can be reliably protected. Also, in the same manner as the liquid crystal display device of the second embodiment described above, since the liquid crystal display device of the present embodiment does not involve removal of the smoothed film 42 in the area directly above the source electrodes 23 and the periphery thereof, the source electrodes 23 can be reliably protected.

Also, since apertures 37 are formed in the drive substrate 41 above the area between the source electrodes 23, and apertures 43 are formed above the area between the gate electrodes 19, a thick film portion is prevented from being formed in the orientation film. The configuration and effects, other than those described above in the liquid crystal display device of the present embodiment, are the same as those of the liquid crystal display device of the second embodiment described above.

Figure 17:
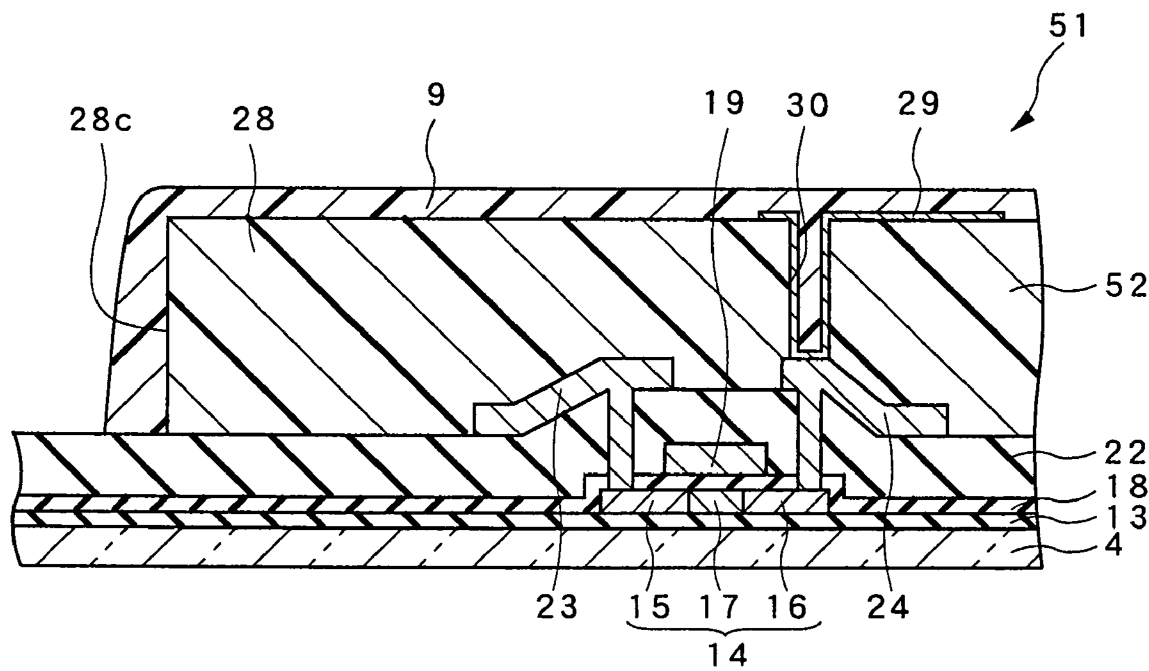
FIG. 17 is a cross-sectional diagram of the drive substrate of the liquid crystal display device of the fourth embodiment of the present invention, and corresponds to a cross-sectional diagram along the line A-A shown in FIG. 7.

Described next is the liquid crystal display device of the fourth embodiment of the present invention. In the same manner as the liquid crystal display device of the first to third embodiments described above, the liquid crystal display device of the present embodiment is provided with a liquid crystal display panel in which a drive substrate and an opposing substrate are disposed parallel to each other by way of a seal member wherein a liquid crystal injection inlet is disposed, and a liquid crystal layer is sealed between the two substrates. FIG. 17 is a cross-sectional diagram of the drive substrate of the liquid crystal display device of the present embodiment, and corresponds to a cross-sectional diagram along the line A-A shown in FIG. 7. In FIG. 17, the same reference numerals are assigned to the same constituent components as those of the liquid crystal display device of the first embodiment shown in FIGS. 6 to 10, and a detailed description thereof is omitted. The drive substrate 51 in the liquid crystal display device of the present embodiment does not have an interlayer insulation film formed on the source electrodes 23 and drain electrodes 24, and a smoothed film 52 is formed so as to cover the source electrodes 23 and drain electrodes 24 on the interlayer insulation film 22, as shown in FIG. 17.

Thus, an interlayer insulation film is not formed on the source electrodes 23 and drain electrodes 24, and the production time can be reduced by directly forming a smoothed film 52. When contact holes 30 are formed for connecting the pixel electrodes 29 and pixel area 26, the contact holes can be formed more easily than etching the interlayer insulation film and the smoothed film, which consist of mutually different materials, in the same manner as the first to third embodiments described above because only the smoothed film 52 is etched.

Since an interlayer insulation film is not formed on the source electrodes 23 and drain electrodes 24 in the drive substrate 51, apertures are not formed in the area directly above the source electrodes 23 and periphery thereof, and the smoothed film 52 must be left as a protective layer. The interlayer insulation film 22 is formed on the gate electrodes 19, and apertures may therefore be formed in the area directly above. The configuration and effects, other than those described above in connection with the liquid crystal display device of the present embodiment, are the same as those of the liquid crystal display device of the second embodiment described above.

Described next is the liquid crystal display device of the fifth embodiment of the present invention. In the same manner as the liquid crystal display device of the first to fourth embodiments described above, the liquid crystal display device of the present embodiment is provided with a orientation film 84 is formed so that the periphery is positioned inside the apertures 82. Since the thickness of the topcoat layer 82 is greater than the thickness of the orientation film 84, the apertures 83 are formed in the topcoat layer 82 so that the thick film portion formed at the edge of the orientation film 84 is absorbed by the apertures 83, and even when an orientation film 84 is formed on the opposing substrate 81, liquid crystal injection can be performed in a shorter amount of time. The configuration and effects, other than those described above in connection with the liquid crystal display device of the present embodiment, are the same as those of the liquid crystal display device of the first embodiment described above.

In the liquid crystal display device of the present embodiment, the drive substrate 1 of the liquid crystal display device of the first embodiment shown in FIG. 6 is used as the drive substrate, but the present invention is not limited thereby, and the drive substrate in the liquid crystal display device of the second to sixth embodiments described above may be used to achieve the same effects.

Figure 18:
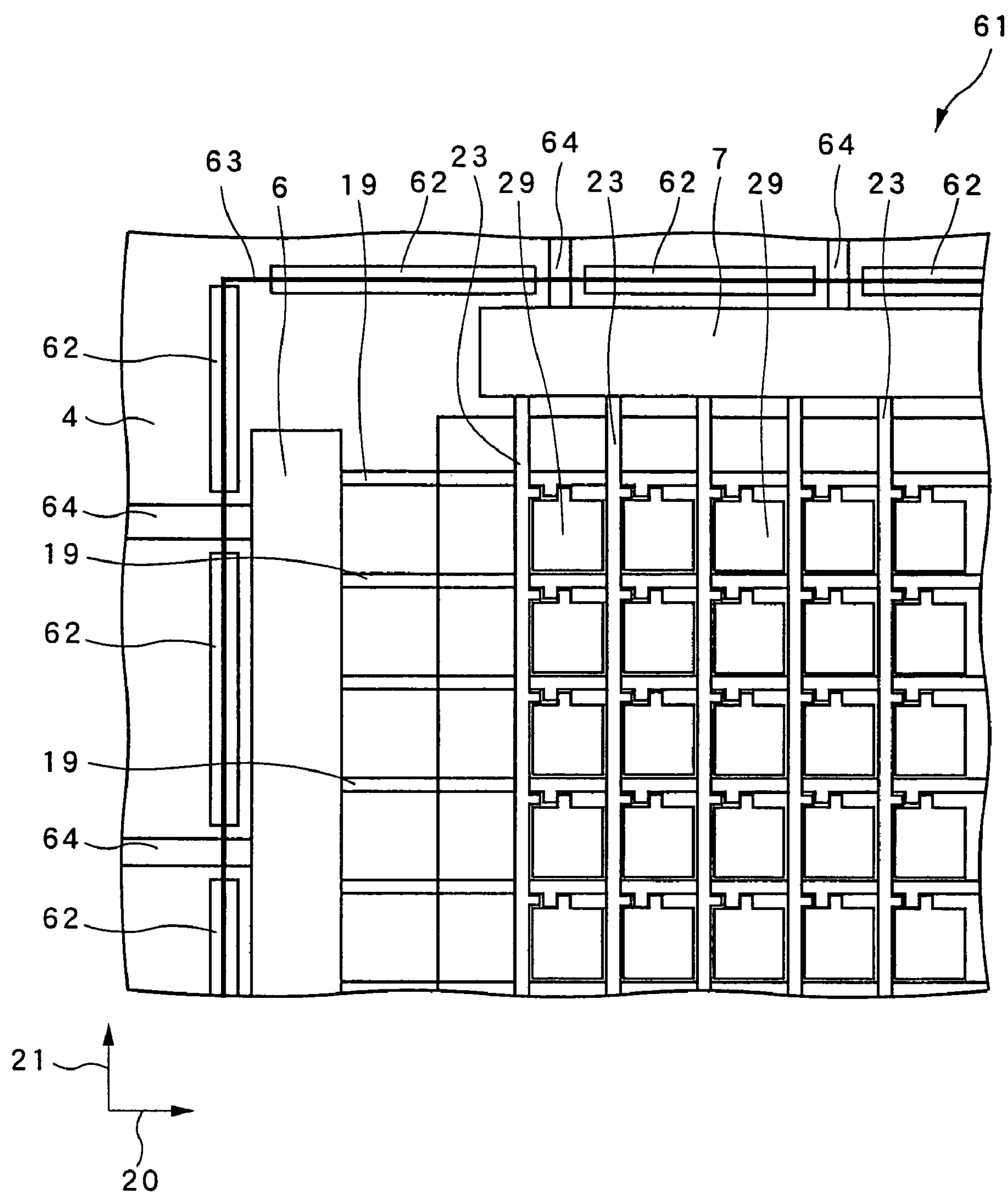
FIG. 18 is an enlarged cross-sectional diagram of the drive substrate of the liquid crystal display device of the fifth embodiment of the present invention.
Figure 21:
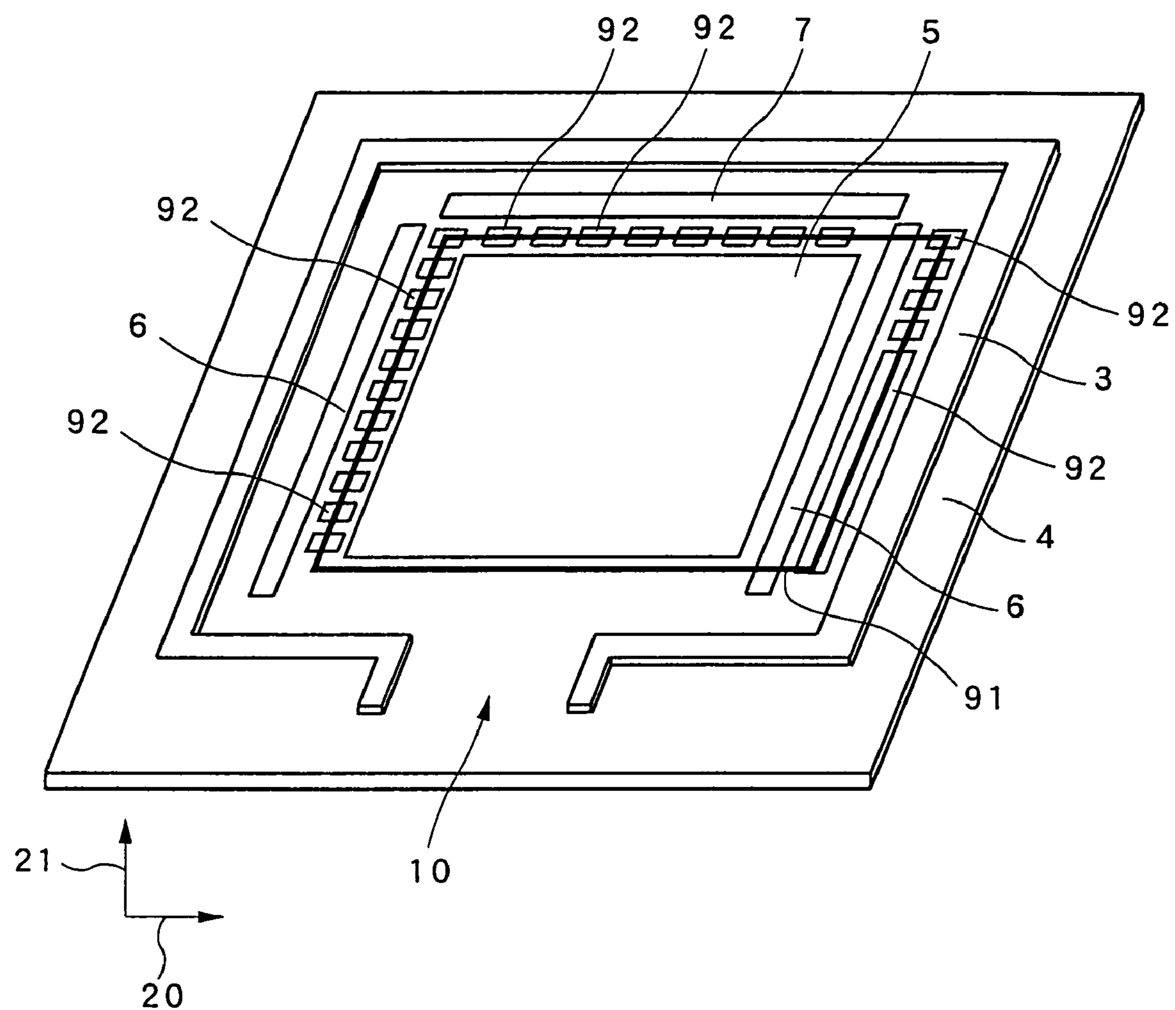
FIG. 21 is a perspective view schematically showing the drive substrate of the liquid crystal display device of the first modified example of the embodiments of the present invention.

In the liquid crystal display device of the first and second embodiments described above, a drive substrate is disposed only on the reverse side of the liquid crystal injection inlet 10 and to one side in the lateral direction 20, but the present invention is not limited thereto, and a gate electrode drive circuit 6 may be disposed on both sides in the lateral direction 20, as shown in FIG. 21, or the gate electrode drive circuit 6 and source liquid crystal display panel in which a drive substrate and an opposing substrate are disposed parallel to each other by way of a seal member wherein a liquid crystal injection inlet is disposed, and a liquid crystal layer is sealed between the two substrates. FIG. 18 is an enlarged cross-sectional diagram of the drive substrate of the liquid crystal display device of the present embodiment. In FIG. 18, the same reference numerals are assigned to the same constituent components as those of the liquid crystal display device of the first embodiment shown in FIGS. 6 to 10, and a detailed description thereof is omitted. The drive substrate 61 in the liquid crystal display device of the present embodiment is provided with apertures 62 in the smoothed film that are disposed further outward than the drive circuits 6 and 7, and an orientation film 63 is formed so as to cover the pixel area and the drive circuits 6 and 7 and so that the periphery is positioned within the apertures 62, as shown in FIG. 18.

Since the number of external connection wirings 64 formed further outward than the drive circuits 6 and 7 is less than the gate electrodes 19 and source electrodes 23, a greater effect can be obtained because the area of the apertures can be increased. The configuration and effects, other than those described above in connection with the liquid crystal display device of the present embodiment, are the same as those of the liquid crystal display device of the first embodiment described above.

Figure 19:
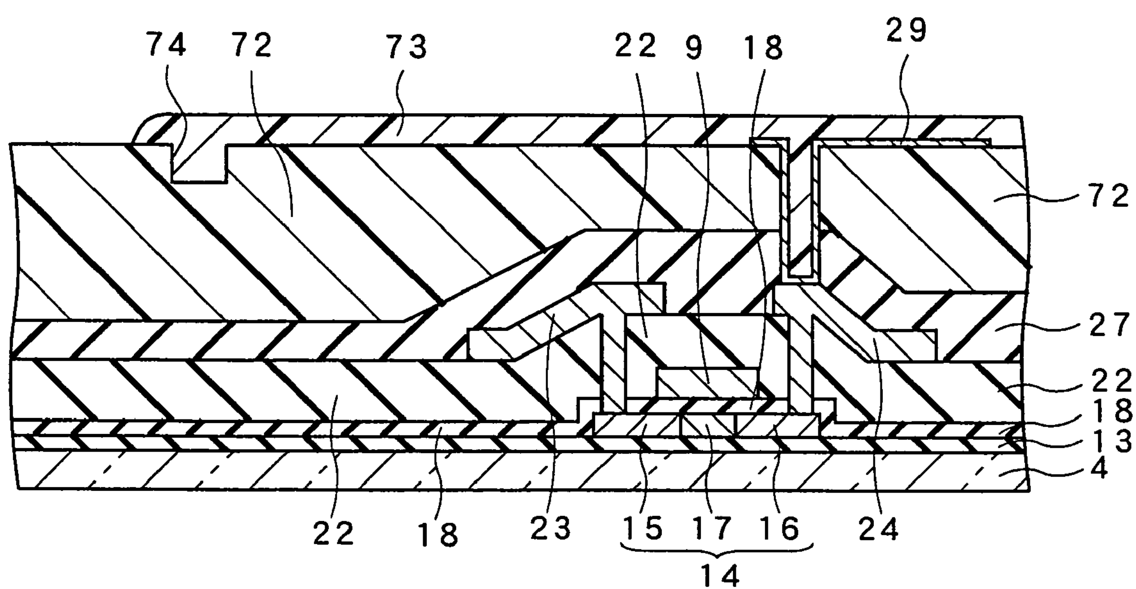
FIG. 19 is a cross-sectional diagram of the drive substrate of the liquid crystal display device of the sixth embodiment of the present invention, and corresponds to a cross-sectional diagram along the line A-A shown in FIG. 7.

Described next is the liquid crystal display device of the sixth embodiment of the present invention. In the same manner as the liquid crystal display device of the first to fifth embodiments described above, the liquid crystal display device of the present embodiment is provided with a liquid crystal display panel in which a drive substrate and an opposing substrate are disposed parallel to each other by way of a seal member wherein a liquid crystal injection inlet is disposed, and a liquid crystal layer is sealed between the two substrates. FIG. 19 is an enlarged cross-sectional diagram of the drive substrate of the liquid crystal display device of the present embodiment, and corresponds to a cross-sectional diagram along the line A-A shown in FIG. 7. In FIG. 19, the same reference numerals are assigned to the same constituent components as those of the liquid crystal display device of the first embodiment shown in FIGS. 6 to 10, and a detailed description thereof is omitted. The drive substrate 71 in the liquid crystal display device of the present embodiment has a configuration in which apertures are not formed in the smoothed film 72, and a recess 74 is formed so that the surface of the orientation film 73 is substantially smooth, as shown in FIG. 19.

In the liquid crystal display device of the present embodiment, since the surface of the orientation film 73 is substantially smooth, the entire area on which the orientation film 73 is formed can be used as a display area. As a result, the liquid crystal display device can be narrowly framed. The configuration and effects, other than those described above in connection with the liquid crystal display device of the present embodiment, are the same as those of the liquid crystal display device of the first embodiment described above.

Figure 20:
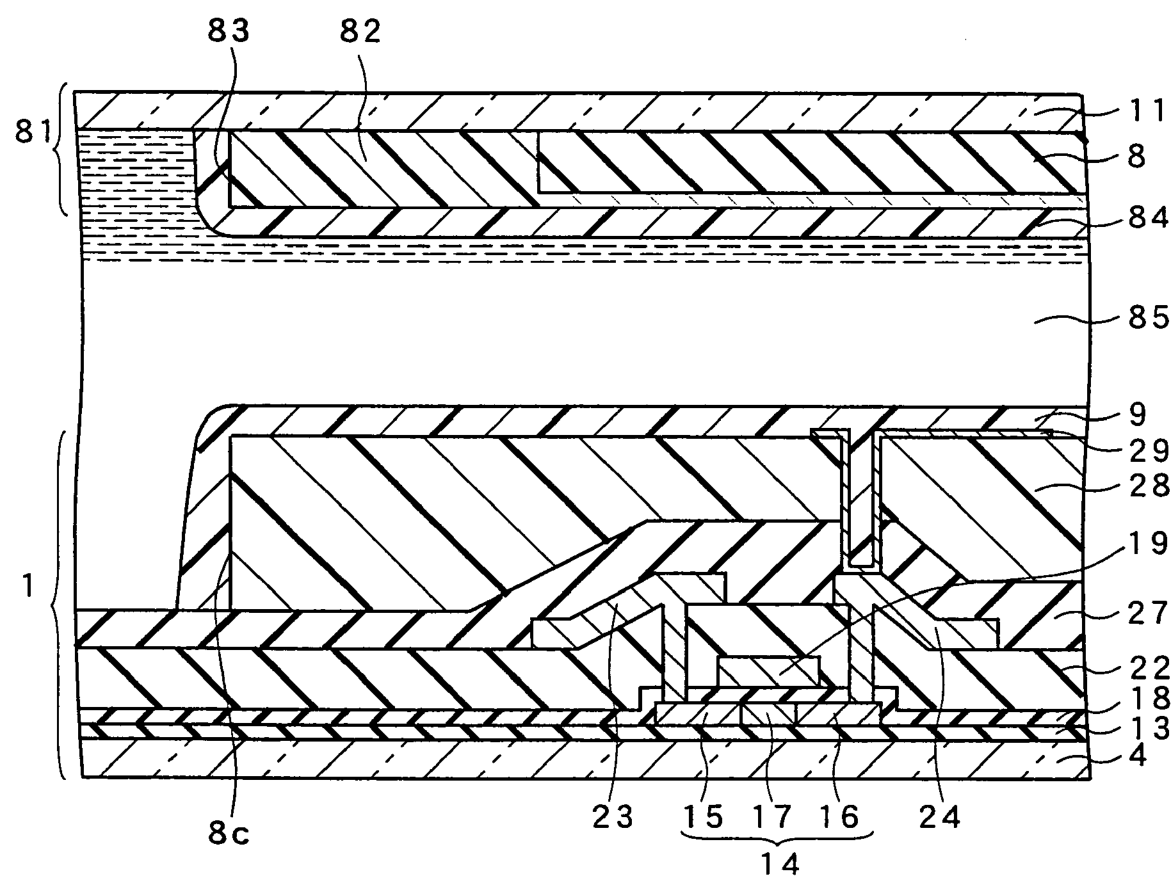
FIG. 20 is a cross-sectional diagram of liquid crystal display device of the seventh embodiment of the present invention, and corresponds to a cross-sectional diagram along the line A-A shown in FIG. 7.

Described next is the liquid crystal display device of the seventh embodiment of the present invention. FIG. 20 is a cross-sectional diagram of the liquid crystal display device of the present embodiment, and corresponds to a cross-sectional diagram along the line A-A shown in FIG. 7. In FIG. 20, the same reference numerals are assigned to the same constituent components as those of the liquid crystal display device of the first embodiment shown in FIGS. 6 to 10, and a detailed description thereof is omitted. In the same manner as the liquid crystal display device of the first to sixth embodiments described above, the liquid crystal display panel of the liquid crystal display device of the present embodiment is configured with a drive substrate 1 and an opposing substrate 81 disposed parallel to each other by way of a seal member (not shown) provided with a liquid crystal injection inlet, and with a liquid crystal layer 85 sealed between the two substrates, as shown in FIG. 20.

Figure 22:
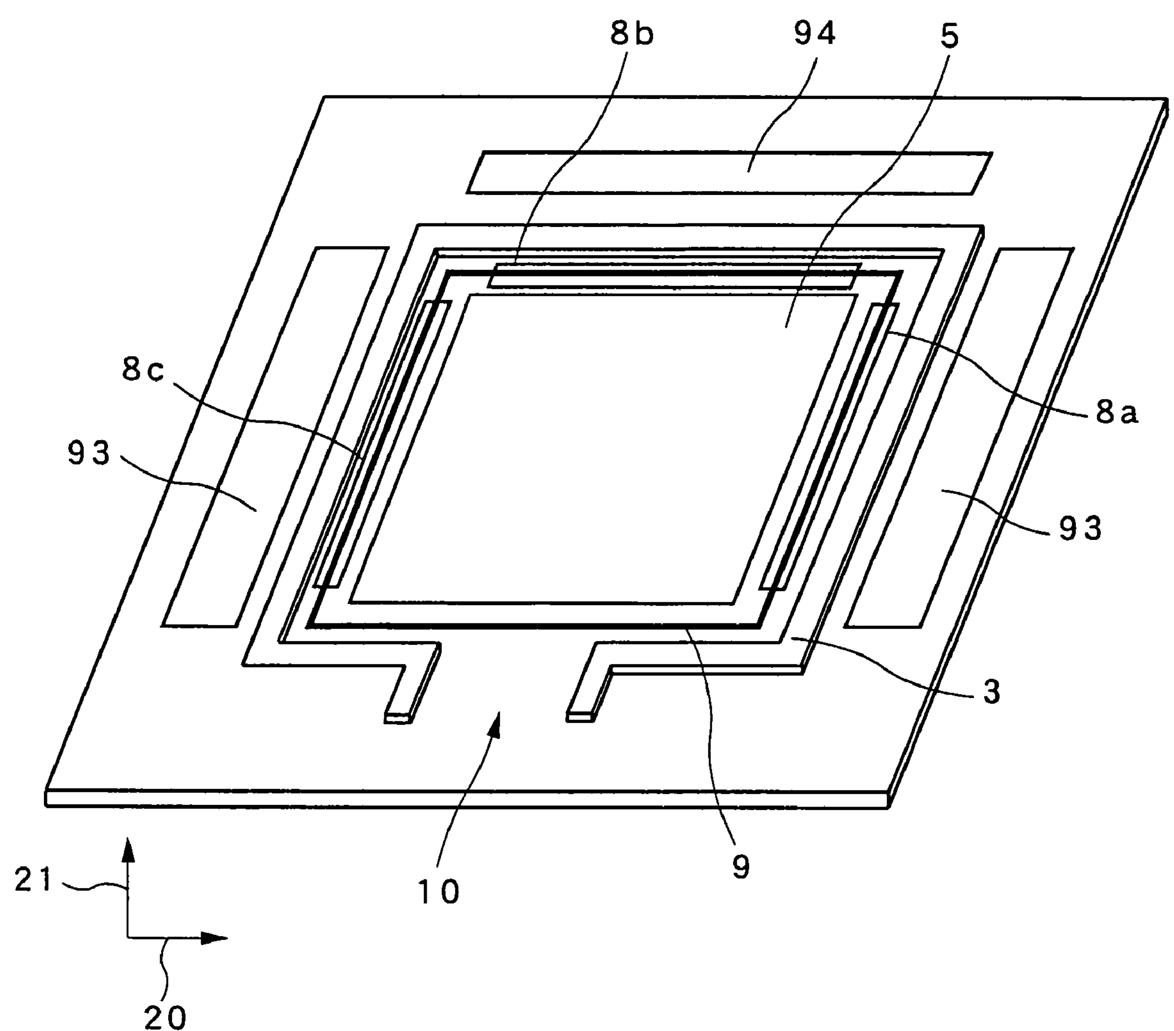
FIG. 22 is a perspective view schematically showing the drive substrate of the liquid crystal display device of the second modified example of the embodiments of the present invention.

The opposing substrate 81 in the liquid crystal display device of the present embodiment has a configuration in which apertures 83 are formed in the topcoat layer 82 along the periphery of the color layer 8, and an orientation film 84 is formed so as to cover the topcoat layer 82. The electrode drive circuit 7 may be formed on the outside of the seal member 3, as shown in FIG. 22. Various modifications can be made by one skilled in the art that are within the scope of the present invention, including aspects that have similar characteristics, to the embodiments related to the presence of apertures in the area directly above the wiring.

The present invention may be applied to active-matrix liquid crystal display devices, and is particularly advantageous in mobile phones and other small electronic equipment.

What is claimed is:

1. A liquid crystal display panel comprising:

a first substrate;

a second substrate disposed facing said first substrate;

a plurality of insulation films provided on at least one substrate selected from said first and second substrates;

a liquid crystal layer sealed between said first and second substrates; and an orientation film which is disposed on the surface of said liquid crystal layer side of said at least one substrate, and which orients liquid crystal molecules of said liquid crystal layer, wherein the plurality of insulation films on which said orientation film is formed is provided with a recess across the entire area or locally in the portion corresponding to the peripheral edge portion of said orientation film, and at least a part the peripheral edge portion of said orientation film is formed inside said recess.

2. The liquid crystal display panel according to claim 1, comprising pixel circuits for applying voltage to said liquid crystal layer, which is disposed on said first substrate, and one of said plurality of insulation films is provided between said orientation film and said pixel circuits.

3. The liquid crystal display panel according to claim 2, wherein thin film transistors are disposed in said pixel circuits.

4. The liquid crystal display panel according to claim 2, wherein said plurality of insulation films has an interlayer insulation film and a smoothed film whose thickness is greater than that of said interlayer insulation film formed on said interlayer insulation film, and wherein said recess includes apertures that are formed in said smoothed film in at least the portion of the area directly below the peripheral edge portion of said orientation film.

5. The liquid crystal display panel according to claim 4, wherein a plurality of wires electrically connected to said pixel circuits are disposed on said first substrate, said wires are formed in the area directly below the peripheral edge portion of said orientation film, and said apertures are formed in portions other than directly above said wires.

6. The liquid crystal display panel according to claim 2, wherein a drive circuit for driving said pixel circuits is disposed on said first substrate, and said plurality of insulation films is also formed on said drive circuit.

7. The liquid crystal display panel according to claim 1, wherein said second substrate is provided with a color layer on the surface side on which said liquid crystal layer is formed and a topcoat layer for covering said color layer, and said orientation film is formed on said topcoat layer.

8. The liquid crystal display panel according to claim 7, wherein an aperture is formed in said topcoat layer in at least a portion of the area directly below the peripheral edge portion of said orientation film.

9. A liquid crystal display device having a liquid crystal display panel, the liquid crystal display panel comprising:

a first substrate;

a second substrate disposed facing said first substrate;

a plurality of insulation films provided on at least one substrate selected from said first and second substrates;

a liquid crystal layer sealed between said first and second substrates; and an orientation film which is disposed on the surface of said liquid crystal layer side of said at least one substrate, and which orients the liquid crystal molecules of said liquid crystal layer, wherein the plurality of insulation films on which said orientation film is formed is provided with a recess across the entire area or locally in the portion corresponding to the peripheral edge portion of said orientation film, and at least a part the peripheral edge portion of said orientation film is formed inside said recess.

10. The liquid crystal display device of claim 9, wherein said liquid crystal display panel comprises pixel circuits for applying voltage to said liquid crystal layer, which is disposed on said first substrate, and one of said plurality of insulation films is provided between said orientation film and said pixel circuits.

11. The liquid crystal display device of claim 10, wherein thin film transistors are disposed in said pixel circuits.

12. The liquid crystal display device of claim 10, wherein said plurality of insulation films has an interlayer insulation film and a smoothed film whose thickness is greater than that of said interlayer insulation film formed on said interlayer insulation film, and wherein said recess includes apertures that are formed in said smoothed film in at least the portion of the area directly below the peripheral edge portion of said orientation film.

13. The liquid crystal display device of claim 12, wherein a plurality of wires electrically connected to said pixel circuits are disposed on said first substrate, said wires are formed in the area directly below the peripheral edge portion of said orientation film, and said apertures are formed in portions other than directly above said wires.

14. The liquid crystal display device of claim 10, wherein a drive circuit for driving said pixel circuits is disposed on said first substrate, and said plurality of insulation films is also formed on said drive circuit.

15. The liquid crystal display device of claim 9, wherein said second substrate is provided with a color layer on the surface side on which said liquid crystal layer is formed and a topcoat layer for covering said color layer, and said orientation film is formed on said topcoat layer.

16. The liquid crystal display device of claim 15, wherein an aperture is formed in said topcoat layer in at least a portion of the area directly below the peripheral edge portion of said orientation film.

* * * * *